United States Patent
Terada et al.

(10) Patent No.: US 10,909,597 B2
(45) Date of Patent: Feb. 2, 2021

(54) APPLICATION SALES MANAGEMENT SERVER SYSTEM AND METHOD

(71) Applicant: FANUC CORPORATION, Yamanashi (JP)

(72) Inventors: Akihiro Terada, Yamanashi (JP); Katsuyuki Yamanaka, Yamanashi (JP); Masaru Oda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/568,686

(22) Filed: Sep. 12, 2019

(65) Prior Publication Data

US 2020/0005376 A1    Jan. 2, 2020

Related U.S. Application Data

(62) Division of application No. 15/992,536, filed on May 30, 2018, now Pat. No. 10,740,811.

(30) Foreign Application Priority Data

Jul. 19, 2017  (JP) ................. 2017-139709

(51) Int. Cl.
 *G06Q 30/00*  (2012.01)
 *G06Q 30/06*  (2012.01)
 (Continued)

(52) U.S. Cl.
 CPC ..... *G06Q 30/0619* (2013.01); *G06Q 30/0613* (2013.01); *G06Q 30/0617* (2013.01);
 (Continued)

(58) Field of Classification Search
 CPC ................ G06Q 30/0601–0645; G06Q 30/08
 (Continued)

(56) References Cited

U.S. PATENT DOCUMENTS

| | | |
|---|---|---|
| 2005/0050319 A1 | 3/2005 | Suraski |
| 2011/0125655 A1 | 5/2011 | Chiyo et al. |

(Continued)

FOREIGN PATENT DOCUMENTS

| | | |
|---|---|---|
| CN | 1744111 | 3/2006 |
| CN | 101114329 | 1/2008 |

(Continued)

OTHER PUBLICATIONS

Machine Tool Apps: A Manufacturing Definition, Feb. 19, 2015, Okuma.com, accessed at [https://www.okuma.com/whitepapers/wp-machine-tool-apps] (Year: 2015).*

(Continued)

*Primary Examiner* — Jeffrey A. Smith
*Assistant Examiner* — Lindsey B Smith
(74) *Attorney, Agent, or Firm* — Wenderoth, Lind & Ponack, L.L.P.

(57) ABSTRACT

An application sales management server system that assists B2B online processing related to sales and distribution of applications while making use of a conventional business practice related to B2B is provided. A sales management server system operating in an edge server communicably connected to one or more edge devices is communicably connected to a terminal of an intermediary dealer that relays sales of applications and a terminal of an end user who uses the edge device and the edge server via a communication unit. A control unit includes: an ordering processing unit that notifies the terminal of a serial number corresponding to an application on the basis of an application purchase request from the terminal of the intermediary dealer; and a distribution processing unit that distributes an application corresponding to a serial number to the edge server in response to receiving the serial number transmitted from the terminal of the end user.

7 Claims, 19 Drawing Sheets

(51) Int. Cl.
*H04L 29/06* (2006.01)
*H04L 29/08* (2006.01)
*H04W 12/08* (2021.01)
*H04W 4/35* (2018.01)

(52) U.S. Cl.
CPC ......... *G06Q 30/0641* (2013.01); *H04L 63/10* (2013.01); *H04L 67/10* (2013.01); *H04L 67/12* (2013.01); *H04W 4/35* (2018.02); *H04W 12/08* (2013.01); *H04L 63/083* (2013.01)

(58) Field of Classification Search
USPC ................................................ 705/26.1–27.2
See application file for complete search history.

(56) References Cited

U.S. PATENT DOCUMENTS

| | | | | |
|---|---|---|---|---|
| 2012/0215662 | A1* | 8/2012 | Ito | G06F 21/10 705/26.61 |
| 2012/0271741 | A1 | 10/2012 | Leonard | |
| 2014/0172595 | A1 | 6/2014 | Beddow et al. | |
| 2014/0379595 | A1 | 12/2014 | Slattery et al. | |
| 2015/0040116 | A1* | 2/2015 | Thormaehlen | G06F 8/65 717/172 |
| 2017/0134948 | A1 | 5/2017 | Gao | |

FOREIGN PATENT DOCUMENTS

| | | |
|---|---|---|
| CN | 102598018 | 7/2012 |
| CN | 103119621 | 5/2013 |
| CN | 105144077 | 12/2015 |
| CN | 105229653 | 1/2016 |
| CN | 106372950 | 2/2017 |
| CN | 106534084 | 3/2017 |
| JP | 2001-331314 | 11/2001 |
| JP | 2002-157408 | 5/2002 |
| JP | 2003-50888 | 2/2003 |
| JP | 2003-296606 | 10/2003 |
| JP | 2004-178382 | 6/2004 |
| JP | 2004-265333 | 9/2004 |
| JP | 2005-004449 | 1/2005 |
| JP | 2005-514703 | 5/2005 |
| JP | 2005-196564 | 7/2005 |
| JP | 2005-276028 | 10/2005 |
| JP | 2008-033561 | 2/2008 |
| JP | 2008-059481 | 3/2008 |
| JP | 2013-149012 | 8/2013 |
| JP | 2014-153836 | 8/2014 |
| JP | 2015-35054 | 2/2015 |
| JP | 6134406 | 4/2017 |
| JP | 2017-111577 | 6/2017 |

OTHER PUBLICATIONS

Office Action dated Feb. 27, 2020 in U.S. Appl. No. 15/992,536.
Office Action dated Oct. 28, 2019 in German Patent Application No. 102018208733.4.
Written Opposition dated Nov. 5, 2019 in Japanese Patent No. 6499729.
Office Action dated Dec. 16, 2019 in Chinese Patent Application No. 201810783669.0.
Office Action dated Dec. 26, 2019 in U.S. Appl. No. 16/014,575.
Yojiro Nishiyama et al., "Report on NTT R & D Forum 2017", NTT Research Planning Division, NTT R & D Forum, Feb. 13-17, 2017 (with English translation).
Office Action dated Sep. 10, 2019, in corresponding Chinese Application No. 201810784460.6.
Office Action dated Oct. 16, 2019, in corresponding U.S. Appl. No. 15/992,536.
Office Action dated Aug. 6, 2019, in corresponding U.S. Appl. No. 16/014,575.
Office Action dated Jul. 5, 2019, in corresponding Chinese Patent Application No. 201810783669.0.
Office Action dated Jun. 10, 2020 in Chinese Patent Application No. 201810784460.6.

* cited by examiner

FIG. 3

| APPLICATION STORAGE UNIT 121 |
|---|
| APPLICATION ID |
| APPLICATION NAME |
| TARGET MODEL INFORMATION |
| INPUT INFORMATION |
| DESCRIPTION |
| APPLICATION |
| PRICE INFORMATION |
| MALL ID |

| USER STORAGE UNIT 122 |
|---|
| USER ID |
| USER NAME |
| USER LEVEL |
| ORDERING RIGHT |
| EDGE SERVER INFORMATION |

| MALL STORAGE UNIT 123 |
|---|
| MALL ID |
| MALL NAME |
| ADMINISTRATOR ID |
| AUTHORIZED USER ID |

| DISTRIBUTION MANAGEMENT STORAGE UNIT 124 |
|---|
| EDGE SERVER ID |
| APPLICATION ID |
| SERIAL NUMBER |
| LICENSE |
| PURCHASE DATE |
| DISTRIBUTION DATE |
| NEXT CONTRACT RENEWAL DATE |
| NEXT CONTRACT RENWWAL NOTIFICATION DATE |
| NOTIFICATION DESTINATION ADDRESS |
| NOTIFICATION COMPLETION FLAG |

FIG. 5

CORRESPONDENCE TABLE BETWEEN USER LEVEL AND PRICE INFORMATION  /150

| USER | LEVEL | BROWSABLE PRICE INFORMATION |
|---|---|---|
| END USER | ch1 | ONLY ch1 |
| LOWER INTERMEDIARY DEALER | ch2 | ch1 AND ch2 |
| HIGHER INTERMEDIARY DEALER | ch3 | ch1 AND ch3 |

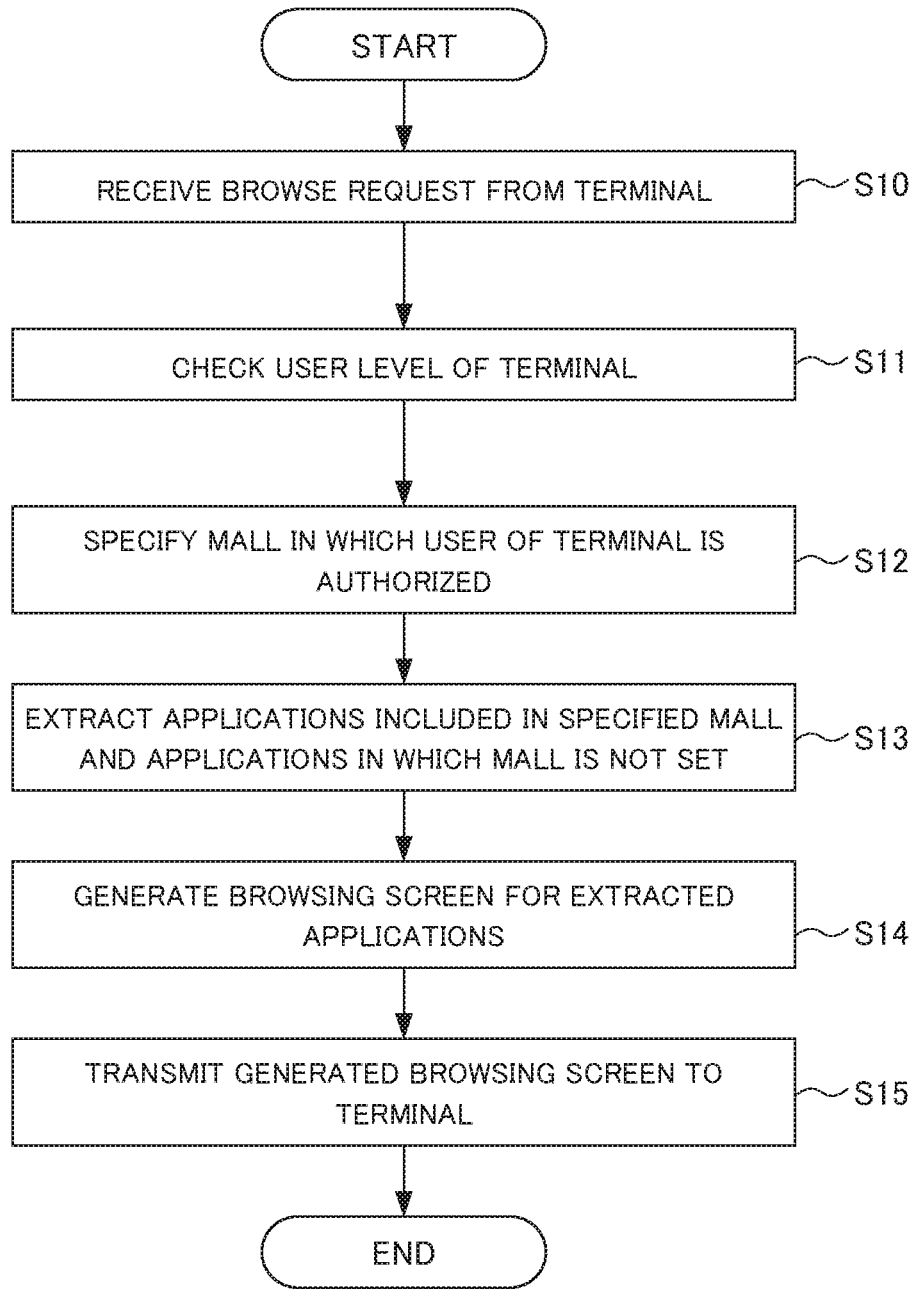

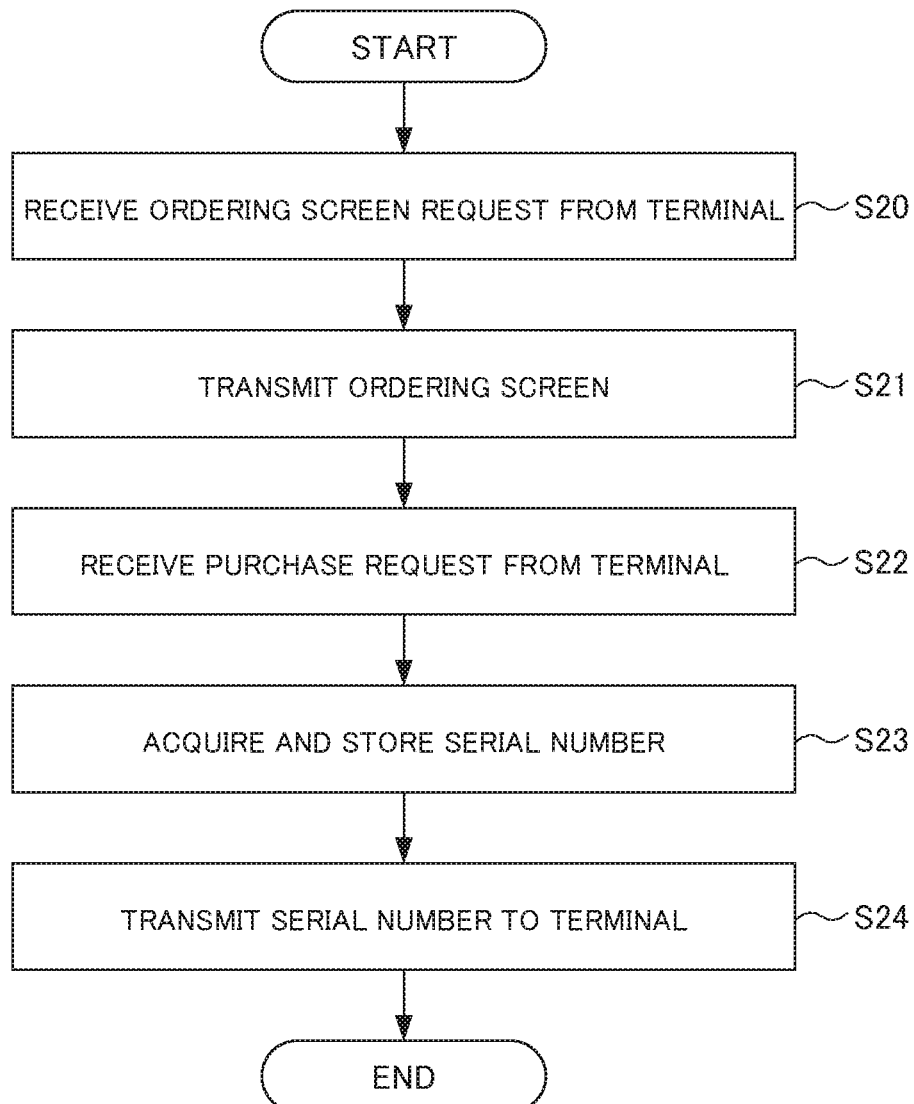

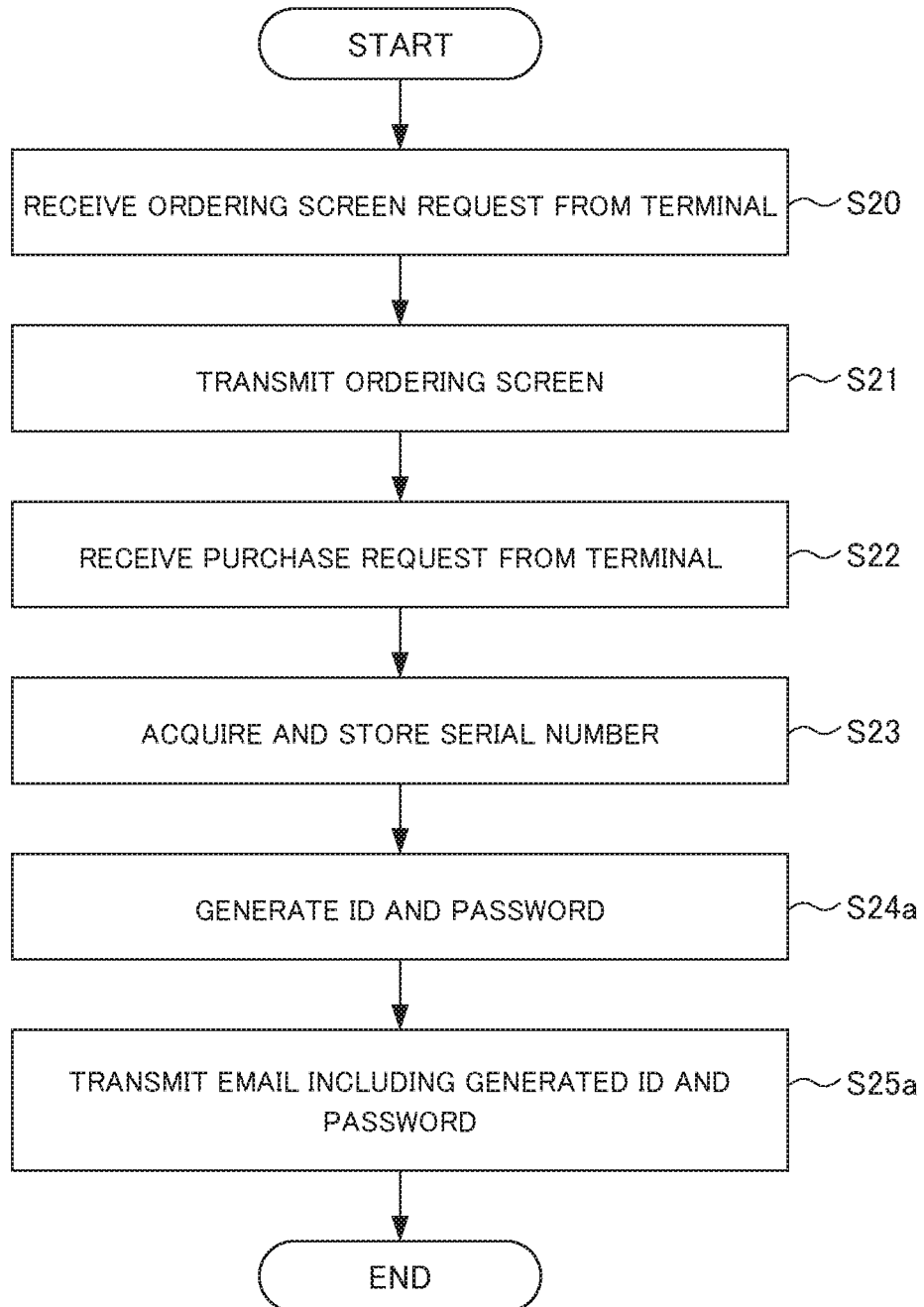

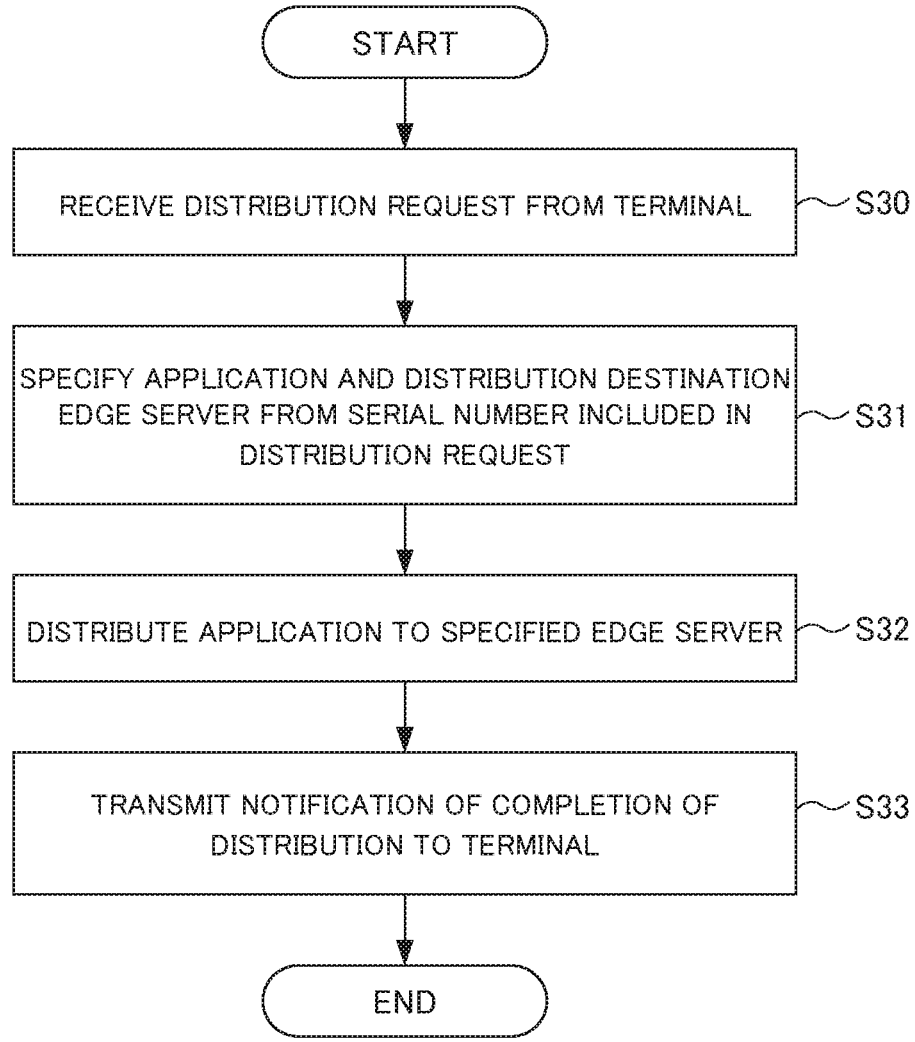

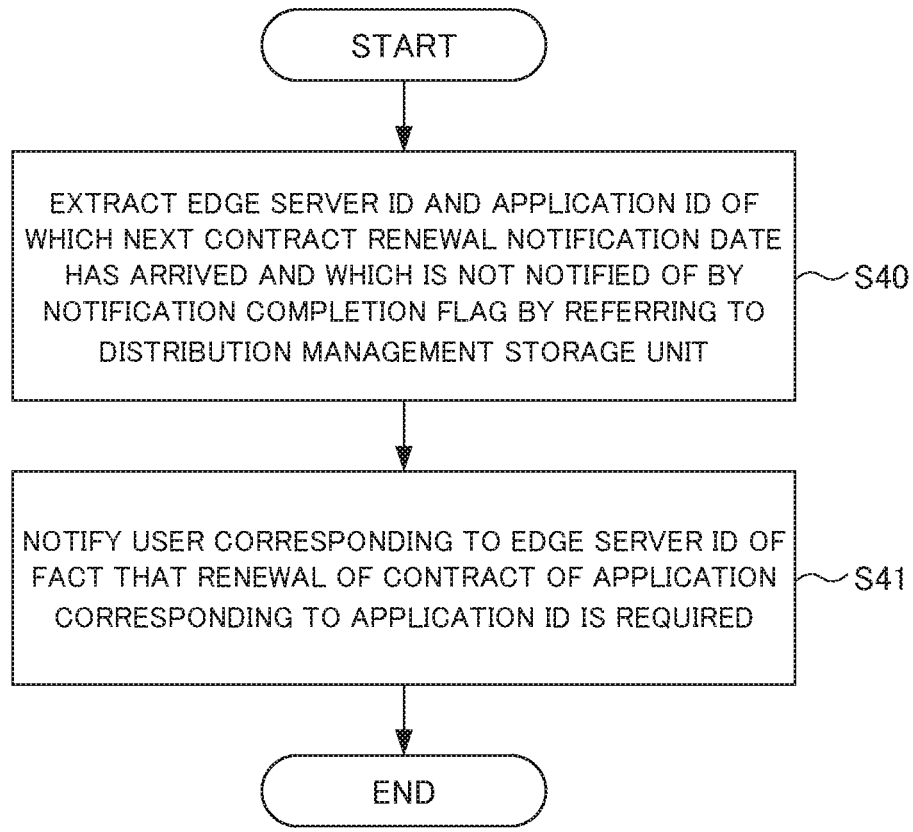

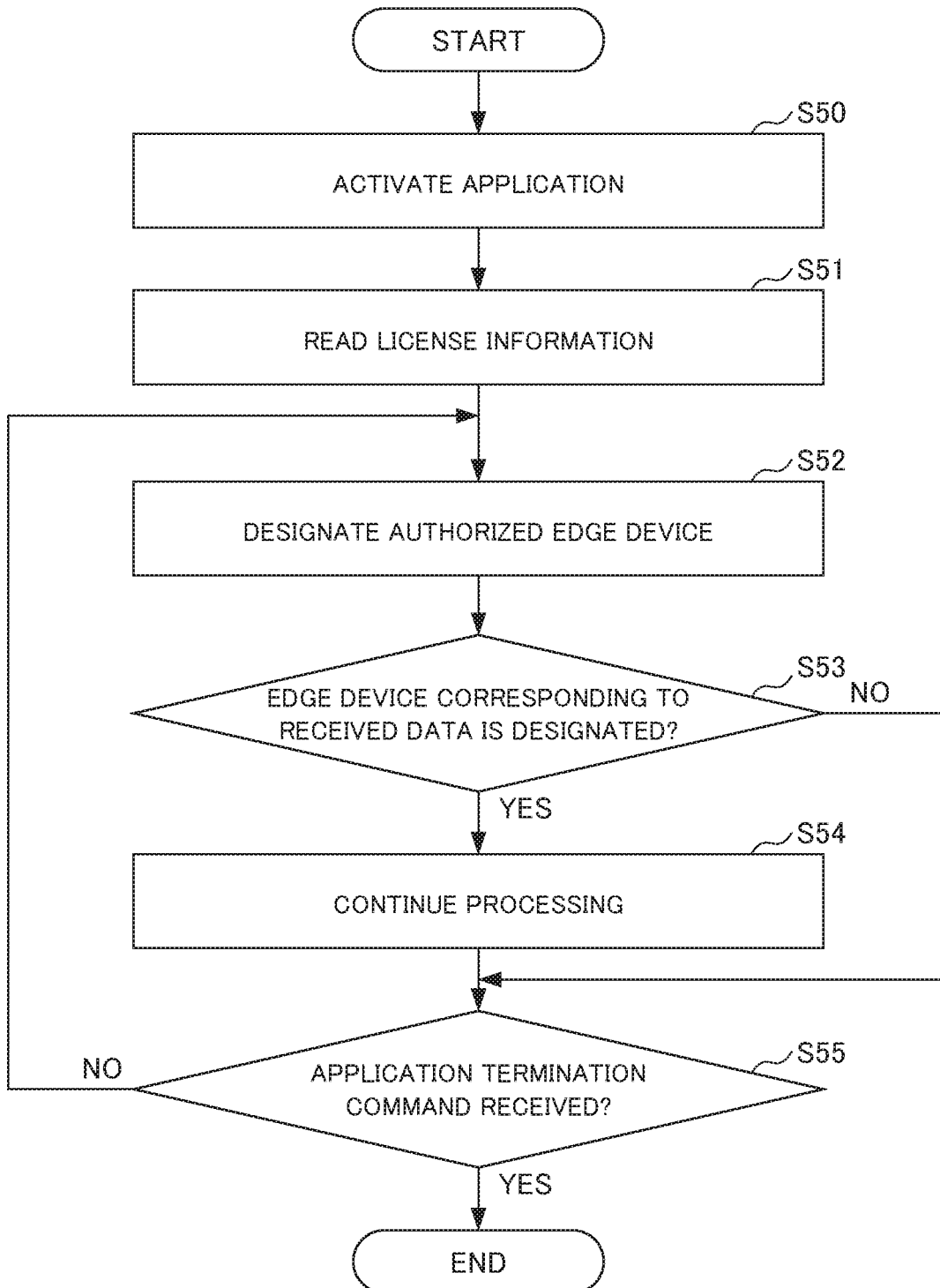

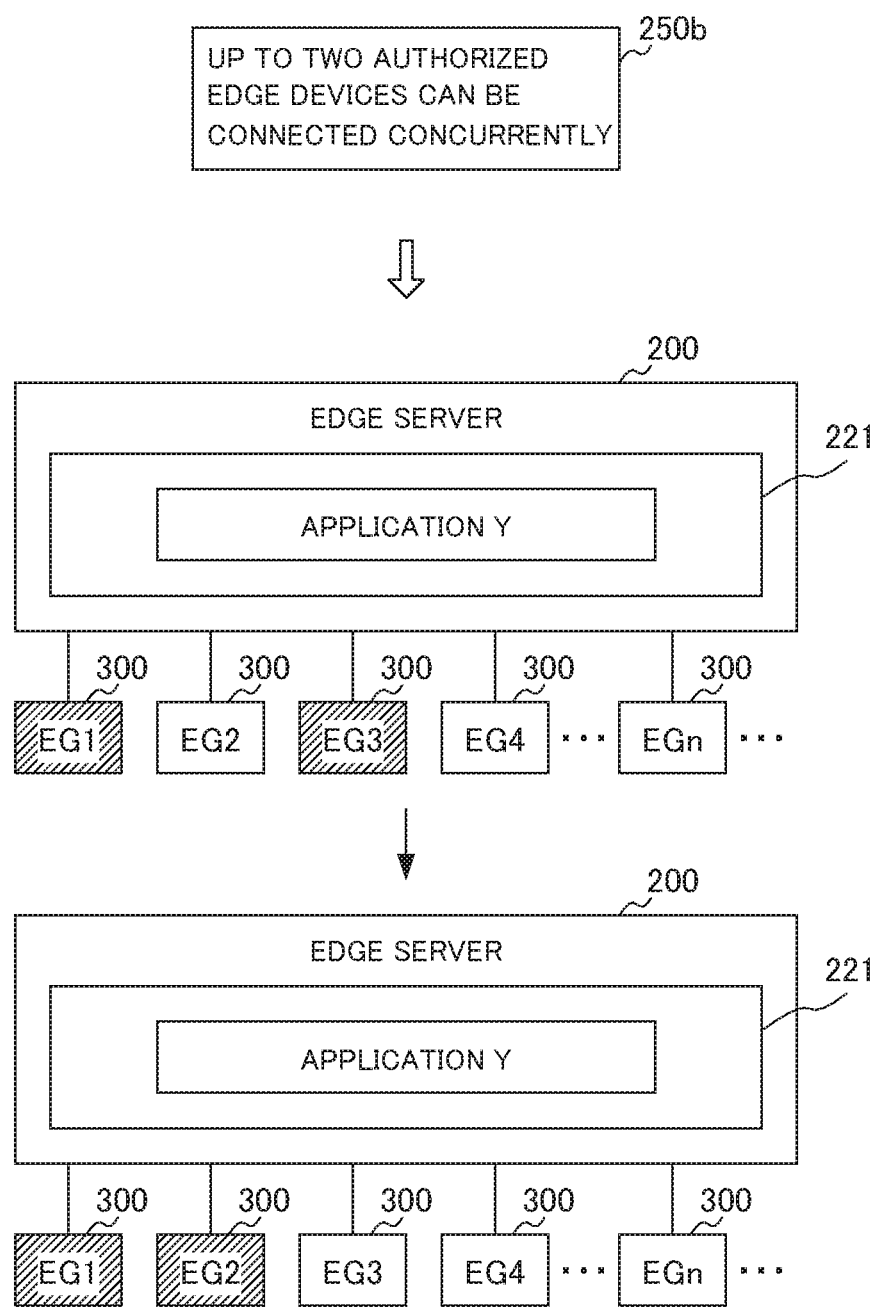

APPLICATION SALES MANAGEMENT SERVER SYSTEM AND METHOD

This application is based on and claims the benefit of priority from Japanese Patent Application No. 2017-139709, filed on 19 Jul. 2017, the content of which is incorporated herein by reference.

BACKGROUND OF THE INVENTION

Field of the Invention

The present invention relates to an application sales management server system.

Related Art

In recent years, pieces of data from various devices are collected via a communication network and analysis or the like is performed using the collected pieces of data so that data can be utilized in various fields. Applications corresponding to respective uses are required analysis and the like the collected pieces of data. It may be convenient if customers can purchase applications by themselves. As a method for allowing customers to purchase applications by themselves, a user accesses a site called a "store" that provides an application distribution and sales service using a smartphone or the like of the user and downloads a desired application. As a form of such an online store, an end user often purchases an application directly from an online store on the basis of a B2C business form.

As a form of an online store, Patent Document 1 discloses a software supply center in which sales target software is received from a seller-side client terminal and is registered in a software information DB, and an application for purchase of desired software retrieved using a retrieval function of a WWW server is received from a buyer-side client terminal. Moreover, Patent Documents 2 to 5 disclose a form of an online store that relays end users for online purchase. Patent Document 2 discloses a contents relay server that receives a contents purchase request from a user reproduction terminal, replaces address information of the user reproduction terminal with address information of a subject device, transmits a proxy purchase request to a contents distribution server, converts the format of the distributed contents, and distributes the contents to the user reproduction terminal. Patent Document 3 discloses a contents sales system that compares purchase intention information transmitted from a purchaser's terminal with contents information transmitted from a seller's terminal to extract a list of all pieces of contents information matching the purchase intention information and notifies a purchaser of an extraction state of the list. Patent Document 4 discloses a contents relay system that extracts contents satisfying a contents utilization request transmitted from a contents utilization applicant from a contents storage unit and distributes the extracted contents to the contents utilization applicant. Patent Document 5 discloses a relay server that receives distribution information including unique information for specifying a person who wants distribution of contents and a distribution target contents, determines a contents distribution server, transmits the distribution information to the contents distribution server, receives encoded contents information obtained by combining the distribution information and a corresponding contents from the contents distribution server, and transmits the contents information to a user terminal.

Patent Document 1: Japanese Unexamined Patent Application, Publication No. 2001-331314
Patent Document 2: Japanese Unexamined Patent Application, Publication No. 2005-196564
Patent Document 3: Japanese Unexamined Patent Application, Publication No. 2004-178382
Patent Document 4: Japanese Unexamined Patent Application, Publication No. 2003-296606
Patent Document 5: Japanese Unexamined Patent Application, Publication No. 2003-050888

SUMMARY OF THE INVENTION

On the other hand, in a manufacturing site such as a plant in a field of a manufacturing apparatus including a CNC machine tool, an industrial apparatus, and an industrial robot, an application of an edge server (hereinafter also referred to as an "application") collects and utilizes data indicating an operation state of a manufacturing apparatus, data indicating a production state of the manufacturing apparatus, data indicating a quality state of a product manufactured by the manufacturing apparatus, data indicating an operating state of the manufacturing apparatus, and the like to take countermeasures such as machine learning or preventive maintenance, for example. Therefore, it will be convenient if users can access a "store site" directed for B2B (Business-to-Business) that provides an application distribution and sales service in a manufacturing site including a CNC machine tool, an industrial apparatus, an industrial robot, and the like to see which application is available and purchase an application for collecting and utilizing various pieces of data generated in the manufacturing site easily by downloading the application to an edge server if an appropriate application is present. However, an operation of setting and the like an application for collecting and utilizing various pieces of data obtained from a CNC machine tool, an industrial apparatus, an industrial robot, and the like provided in a plant or the like requires specialized knowledge. Due to this, it is a common practice that a specialized dealer (hereinafter also referred to as an "intermediary dealer") such as a system integrator makes environment settings for hardware and software when utilizing an application in a manufacturing site such as a plant. According to a conventional business practice, when purchasing applications and apparatuses such as a manufacturing apparatus, an end user who uses the manufacturing apparatus or the like places an order to a specialized dealer such as a system integrator. The system integrator or the like places another order to a specialized dealer such as a machine tool manufacturer. However, none of the online store systems disclosed in Patent Documents 1 to 5 assists online processing related to B2B by a specialized dealer such as an end user, a system integrator, or a machine tool manufacturer in order to enable a server application to be purchased and installed in a manufacturing site having a CNC machine tool, an industrial apparatus, an industrial robot, and the like while making use of a business practice related to B2B by the specialized dealer such as an end user, a system integrator, or a machine tool manufacturer in a field of a manufacturing apparatus including a CNC machine tool, an industrial apparatus, an industrial robot, and the like.

An object of the present invention is to provide an application sales management server system that assists online processing related to B2B by a specialized dealer such as an end user, a system integrator, or a machine tool manufacturer in order to enable the above-described application to be purchased and installed in a manufacturing site having a CNC machine tool, an industrial apparatus, an industrial robot, and the like while making use of a conventional business practice related to B2B particularly in a field of a manufacturing apparatus including a CNC machine tool, an industrial apparatus, an industrial robot, and the like.

(1) An application sales management server system (for example, a "sales management server system 100" to be described later) of the present invention manages sales of applications operated by an edge server (for example, an "edge server 200" to be described later) communicably connected to one or more edge devices (for example, an "edge device 300" to be described later), the system including: a communication unit (for example, a "communication unit 130" to be described later); a control unit (for example, a "control unit 110" to be described later); and a storage unit (for example, a "storage unit 120" to be described later), wherein the system is communicably connected to a user terminal (for example, a "terminal 400" to be described later) of an intermediary dealer that relays sales of applications and a user terminal (for example, a "terminal 400" to be described later) of an end user who uses the edge device and the edge server via the communication unit, and the control unit includes: a distribution authorization notification unit (for example, an "ordering processing unit 112" to be described later) that notifies the user terminal of the intermediary dealer of information (for example, "ID and password" to be described later) related to authorization of distribution or distribution authorization information (for example, a "serial number" to be described later) corresponding to the application on the basis of an application purchase request transmitted from the user terminal of the intermediary dealer to the application sales management server system; and an application distribution unit (for example, a "distribution processing unit 113" to be described later) that distributes the application corresponding to the distribution authorization information to the edge server in response to receiving the distribution authorization information from the user terminal of the end user.

(2) In the application sales management server system (for example, a "sales management server system 100" to be described later) according to (1), the distribution authorization notification unit (for example, an "ordering processing unit 112" to be described later) of the control unit may notify the user terminal of the intermediary dealer of the information related to authorization of distribution or the distribution authorization information corresponding to the application when the intermediary dealer has an ordering right to transmit the application purchase request directly.

(3) In the application sales management server system (for example, a "sales management server system 100" to be described later) according to (2), the control unit (for example, a "control unit 110" to be described later) may include: a sales price information providing unit (for example, a "browsing information providing unit 111" to be described later) that provides application sales price information based on a level of a user in response to an inquiry of the application sales price information from the user terminal of each user communicably connected to the application sales management server system, and the sales price information providing unit may provide only application sales price information correlated with the level of the end user in response to the inquiry of the application sales price information from the user terminal of the end user.

(4) In the application sales management server system (for example, a "sales management server system 100" to be described later) according to (3), the sales price information providing unit (for example, a "browsing information pro-viding unit 111" to be described later) of the control unit may provide application sales price information corresponding to a level of the intermediary dealer in response to an inquiry of application sales price information from the user terminal of the intermediary dealer.

(5) In the application sales management server system (for example, a "sales management server system 100" to be described later) according to (3), the sales price information providing unit (for example, a "browsing information providing unit 111" to be described later) of the control unit may provide application sales price information correlated with the level of the end user in addition to the application sales price information corresponding to a level of the intermediary dealer in response to an inquiry of application sales price information from the user terminal of the intermediary dealer.

(6) In the application sales management server system (for example, a "sales management server system 100" to be described later) according to any one of (1) to (5), the control unit (for example, a "control unit 110" to be described later) may include: an application distribution information management unit that stores and manages distribution information of the application distributed to the edge server in the storage unit (for example, a "distribution management storage unit 124" to be described later) in correlation with the edge server.

(7) In the application sales management server system (for example, a "sales management server system 100" to be described later) according to any one of (1) to (6), the information related to authorization of distribution may be access information for accessing an exclusive screen related to purchase of the application.

(8) In the application sales management server system (for example, a "sales management server system 100" to be described later) according to any one of (1) to (7), the application distribution unit (for example, a "distribution processing unit 113" to be described later) of the control unit may further transmit a license related to the application correlated with the application distribution authorization information to the edge server.

(9) Another application sales management server system of the present invention manages sales of applications operated by an edge server communicably connected to one or more edge devices includes: a communication unit; a control unit; and a storage unit, wherein the system is communicably connected to user terminals of each user including an intermediary dealer that relays purchase of applications and an end user who uses the edge device and the edge server via the communication unit, and the control unit includes: a purchaser management unit that manages users who can purchase the application; a distribution authorization notification unit that notifies the user terminal of information related to authorization of distribution or distribution authorization information corresponding to the application when an application purchase request received from the user terminal is transmitted from the user who can purchase the application by referring to the purchaser management unit; and an application distribution unit that distributes the application corresponding to the distribution authorization information to the edge server specified from the distribution authorization information in response to receiving the distribution authorization information from the user terminal of a user different from the user who has transmitted the application purchase request.

(10) In the application sales management server system according to (9), the purchaser management unit of the control unit may manage the user who can purchase the application and specific password information for specifying the user in correlation, the control unit may include: a receiving unit that receives the application purchase request together with the specific password information; and a comparing unit that compares the specific password information received by the receiving unit with the specific password information managed by the purchaser management unit, and the distribution authorization notification unit may further notify the user terminal of the information related to authorization of distribution or the distribution authorization information corresponding to the application when both pieces of password information match.

According to the present invention, it is possible to provide an application sales management server system that assists B2B online processing related to sales and distribution of applications while making use of a conventional business practice related to B2B particularly in a field of a manufacturing apparatus including a CNC machine tool, an industrial apparatus, an industrial robot, and the like.

BRIEF DESCRIPTION OF THE DRAWINGS

FIG. 3 is a diagram illustrating an example of a storage unit of the sales management server system according to the present embodiment.

FIG. 5 is a diagram illustrating an example of a correspondence table of a user level and price information according to the present embodiment.

FIG. 12 is a flowchart illustrating a browsing information providing process of the sales management server system according to the present embodiment.

FIG. 13A is a flowchart illustrating an ordering process of the sales management server system according to the present embodiment.

FIG. 13B is a flowchart illustrating an ordering process of the sales management server system according to a modification of the present embodiment.

FIG. 14 is a flowchart illustrating an application distribution process of the sales management server system according to the present embodiment.

FIG. 15 is a flowchart illustrating a contract renewal notification process of the sales management server system according to the present embodiment.

FIG. 16 is a flowchart illustrating a license control process of an edge server according to the present embodiment.

FIG. 17B is a diagram illustrating a specific example of an edge device of which the license is controlled by the edge server according to the present embodiment.

DETAILED DESCRIPTION OF THE INVENTION (Embodiment)

Figure 1:
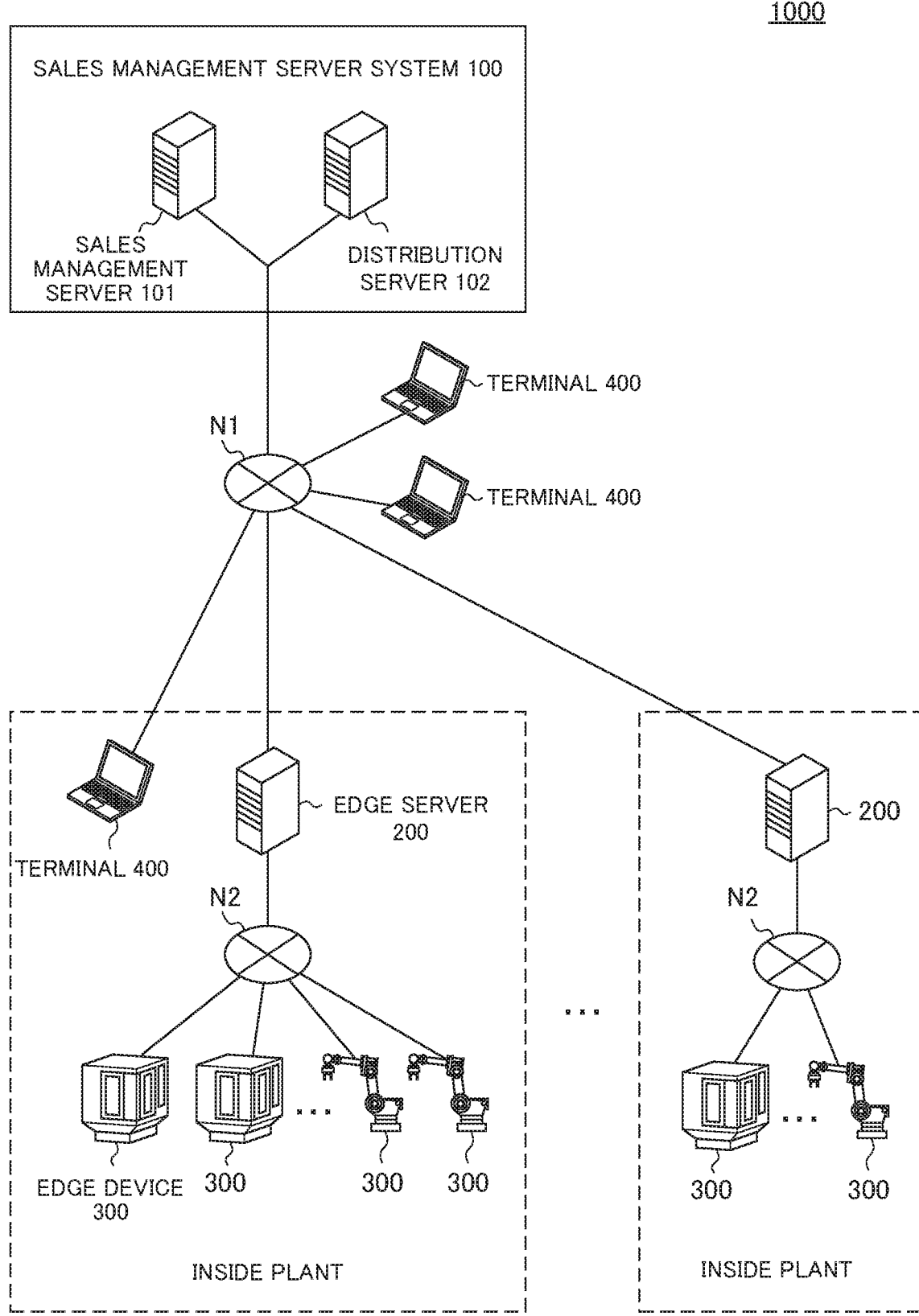
FIG. 1 is a schematic diagram illustrating a basic configuration of an application sales management server according to the present embodiment.

A configuration of an application sales management system 1000 according to the present embodiment will be described. FIG. 1 is a schematic diagram illustrating a basic configuration of the application sales management system 1000 according to the present embodiment. The application sales management system 1000 includes a sales management server system 100 (an application sales management server system), an edge server 200, an edge device 300, and a terminal 400 (a user terminal). Here, the edge device 300 indicates a manufacturing apparatus including a CNC machine tool, an industrial apparatus, an industrial robot, and the like, provided in a manufacturing site such as a plant and an apparatus associated with the manufacturing apparatus such as an image sensor or a programmable logic controller (PLC) unless particularly stated otherwise. The edge server 200 indicates a server in which the edge device 300 is a client.

The application sales management system 1000 is an online system for assisting an end user related to sales and distribution of a server application operating in the edge server 200 and an intermediary dealer including a specialized dealer such as a system integrator and a machine tool manufacturer in executing online processing of B2B related to sales and distribution of the application using the respective terminals 400. An example of the server application operating in the edge server 200 is an application that collects data indicating an operation state related to the edge device 300, data indicating a production state, data indicating a quality state of a product, and data indicating an operating state to perform information processing, but an example thereof is not limited thereto. In the following description, a server application of which the sales is managed by the application sales management system 1000 is also referred to simply as an application.

The sales management server system 100 and the edge server 200 are connected via a network N1. The sales management server system 100 is communicably connected to the terminal 400 via the network N1. The network N1 is the Internet, a virtual private network (VPN), a public telephone network, or the like, for example. A specific communication method of the network N1 and whether the network is a cable connection or a wireless connection are not particularly limited. The edge server 200 and one or more edge devices 300 are provided in a plant facility or the like of an end user, for example, and are communicably connected via a network N2 such as a local area network (LAN). The network N2 may include a network switch or the like.

The sales management server system 100 is operated and managed by a company (hereinafter also referred to as an operating company) that performs sales and management of applications operating in the edge server 200. As illustrated in FIG. 1, the sales management server system 100 includes a sales management server 101 and a distribution server 102, for example. The sales management server system 100 may be configured as one server having the functions of the sales management server 101 and the distribution server 102. Moreover, the sales management server system 100 may be configured as a plurality of servers and processes may be distributed to respective servers. Moreover, the sales management server system 100 may be configured, for example, such that the sales management server 101 is communicably connected to the edge server 200 and the like via the network N1 and the distribution server 102 communicates with the edge server 200 and the like via the sales management server 101 without being connected to the network N1. Furthermore, although the edge device 300 may be communicably connected to the sales management server 101, it is preferable that the edge device 300 is not communicably connected to the distribution server 102.

The edge server 200 is a server that executes an application purchased from the sales management server system 100 to thereby collect data indicating the operation state related to one or more edge devices 300, data indicating the production state, data indicating the quality state of a product, and data indicating the operating state, for example, from the edge devices 300 to perform predetermined information processing related to the application. As described above, the edge device 300 is a manufacturing apparatus such as a CNC machine tool, an industrial apparatus, or an industrial robot provided in a manufacturing site such as a plant. One or more edge devices 300 form a line or a cell of a plant, for example.

The terminal 400 is a personal computer (PC), for example. The terminal 400 is a terminal which is communicably connected to the sales management server system 100 and is used by an end user related to sales and distribution by B2B of an application and an intermediary dealer including a specialized dealer such as a system integrator and a machine tool manufacturer, for example. Here, the terminal 400 used by an end user may be provided inside a plant facility and may be provided outside a plant facility. An end user can access the sales management server system 100 via the terminal 400 and browse the contents of applications that the end user can purchase. Moreover, an intermediary dealer or the like including a specialized dealer such as a system integrator or a machine tool manufacturer who relays the purchase of applications for an end user can order an application via the terminal 400.

The application sales management system 1000 can be used only by a user (an end user and an intermediary dealer) who is evaluated by an operating company in advance to satisfy necessary requirements (qualifications or the like) for using the application sales management system 1000 and is assigned with a user identification (ID) for accessing the application sales management system 1000. The details will be described later.

Figure 2:
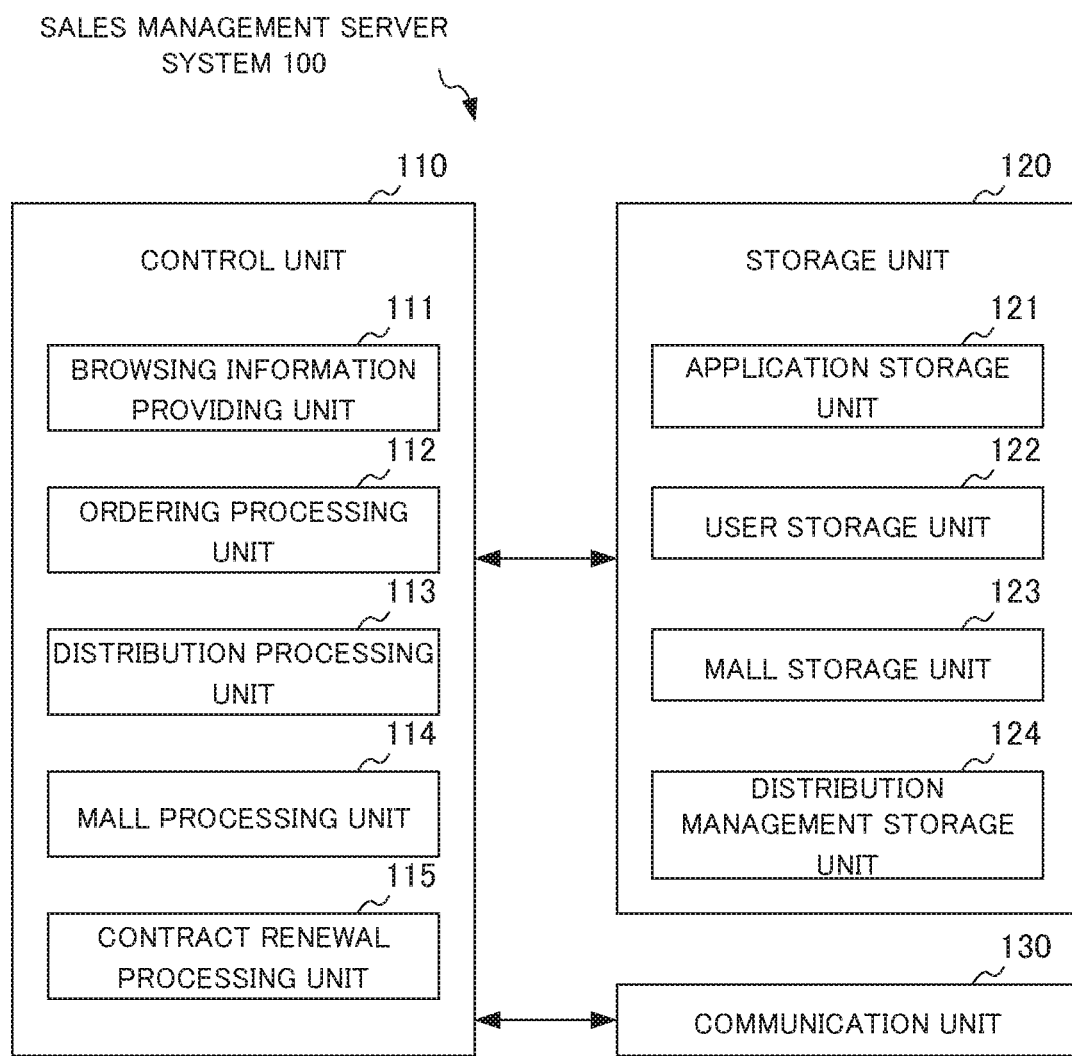
FIG. 2 is a functional block diagram of a sales management server system according to the present embodiment.

Next, a configuration of the sales management server system 100 will be described. FIG. 2 is a functional block diagram of the sales management server system 100 according to the present embodiment. FIG. 3 is a diagram illustrating an example of a storage unit 120 of the sales management server system 100 according to the present embodiment. The sales management server system 100 illustrated in FIG. 2 includes a control unit 110, a storage unit 120, and a communication unit 130. The control unit 110 may be a CPU and controls the sales management server system 100 in an integrated manner by executing various programs stored in the storage unit 120.

In the present embodiment, the control unit 110 includes a browsing information providing unit 111, an ordering processing unit 112, a distribution processing unit 113, a mall processing unit 114, a contract renewal processing unit 115 as functional units based on the programs stored in the storage unit 120. Prior to description of the respective functional units of the control unit 110, the storage unit 120 will be described first. The storage unit 120 includes an application storage unit 121, a user storage unit 122, a mall storage unit 123, and a distribution management storage unit 124 in addition to the programs executed by the control unit 110.

<Application Storage Unit 121>

The application storage unit 121 is a storage area that stores applications sold by the application sales management system 1000. An application traded in the application sales management system 1000 is an application operated by the edge server 200. The application storage unit 121 illustrated in FIG. 3 stores an application name, target model information, input information, an application description, an application itself, price information, a mall ID, and the like in correlation with an application ID. The application ID is identification information for identifying an application. The target model information is model information of the edge device 300 which is an input/output target of the application and is a model name of a CNC machine tool, an industrial apparatus, an industrial robot, or the like, for example. The input information is edge device information including input data information or the like input from the edge device 300. The application description includes a description on a license as a description on the specifications of an application. The description on a license includes information on designation of the edge device 300 indicating whether the edge device 300 that uses the application is designated and information on the number of edge devices to be used concurrently indicating whether it is necessary to purchase a number of edge devices 300 to be used concurrently or there is no limit in the number of edge devices to be used concurrently, for example. With regard to the use of application, the description also includes a description on renewal of a contract. The price information is information on a sales price of an application. The price information corresponds to a user level of a user who accesses via the terminal 400 and has price information corresponding to each user level. The user level will be described later. The mall ID indicates that the application corresponds to a predetermined mall. When an application does not correspond to a mall, the mall ID is blank. A detailed description of a mall unique to the present invention will be provided later.

<User Storage Unit 122>

The user storage unit 122 is a storage area that stores information on a user who is authorized to access the application sales management system 1000. As described above, in order to access the application sales management system 1000, it is necessary to satisfy predetermined requirements (qualifications or the like), and a user who satisfies the predetermined requirements (qualifications or the like) is assigned with a user ID for accessing the application sales management system 1000. Here, a user includes an end user and an intermediary dealer including a specialized dealer such as a system integrator and a machine tool manufacturer.

The user storage unit 122 illustrated in FIG. 3 stores a user name, a user level, an ordering right, edge server information, and the like in correlation with the user ID. Moreover, the user storage unit 122 may store a mall ID of a mall that the user is authorized to access in correlation with the user ID. The user ID is identification information for identifying a user. The user level is determined by an attribute of the user. In the present embodiment, it is assumed that the user level has three levels from user level 1 (also referred to as "ch1") to user level 3 (also referred to as "ch3"). More specifically, user level 1 (ch1) indicating that the user is an end user, user level 2 (ch2) indicating the user is a specialized dealer (an intermediary dealer) including a vendor, a system integrator, and the like, for example, and user level 3 (ch3) indicating that the user is a specialized dealer (an intermediary dealer) including a machine tool manufacturer, a facility manufacturer, and the like, for example, are illustrated. In the following description, user level 2 will be also referred to as a lower intermediary dealer and user level 3 will be also referred to as a higher intermediary dealer. The ordering right is information for identifying whether a user (a specialized dealer (an intermediary dealer) or an end user) identified by the user ID is authorized to transmit an application purchase request directly to the application sales management system 1000. Only when a user has the ordering right, the user can transmit an application purchase request directly to the application sales management system 1000. The edge server information is information on the edge server 200 provided in a plant or a manufacturing site associated with the user particularly when the user is an end user and is information for identifying the edge server 200 which is an application distribution destination. The edge server information includes at least an edge server ID for identifying the edge server 200, address information on a communication network such as an IP address of the edge server 200, and the like. The edge server ID is necessary for identifying respective edge servers 200 when one or more edge servers 200 are provided in a plant or the like associated with the user, for example. Moreover, the edge server information may include information on an edge device 300 serving as a client candidate of the edge server 200, which is likely to input and output information with respect to the edge server 200. The information on the edge device 300 may include an edge device ID for identifying the edge device 300, a model name of the edge device 300, an address (for example, an IP address) on a communication network of the edge device 300, and the like.

<Mall Storage Unit 123>

Figure 4:
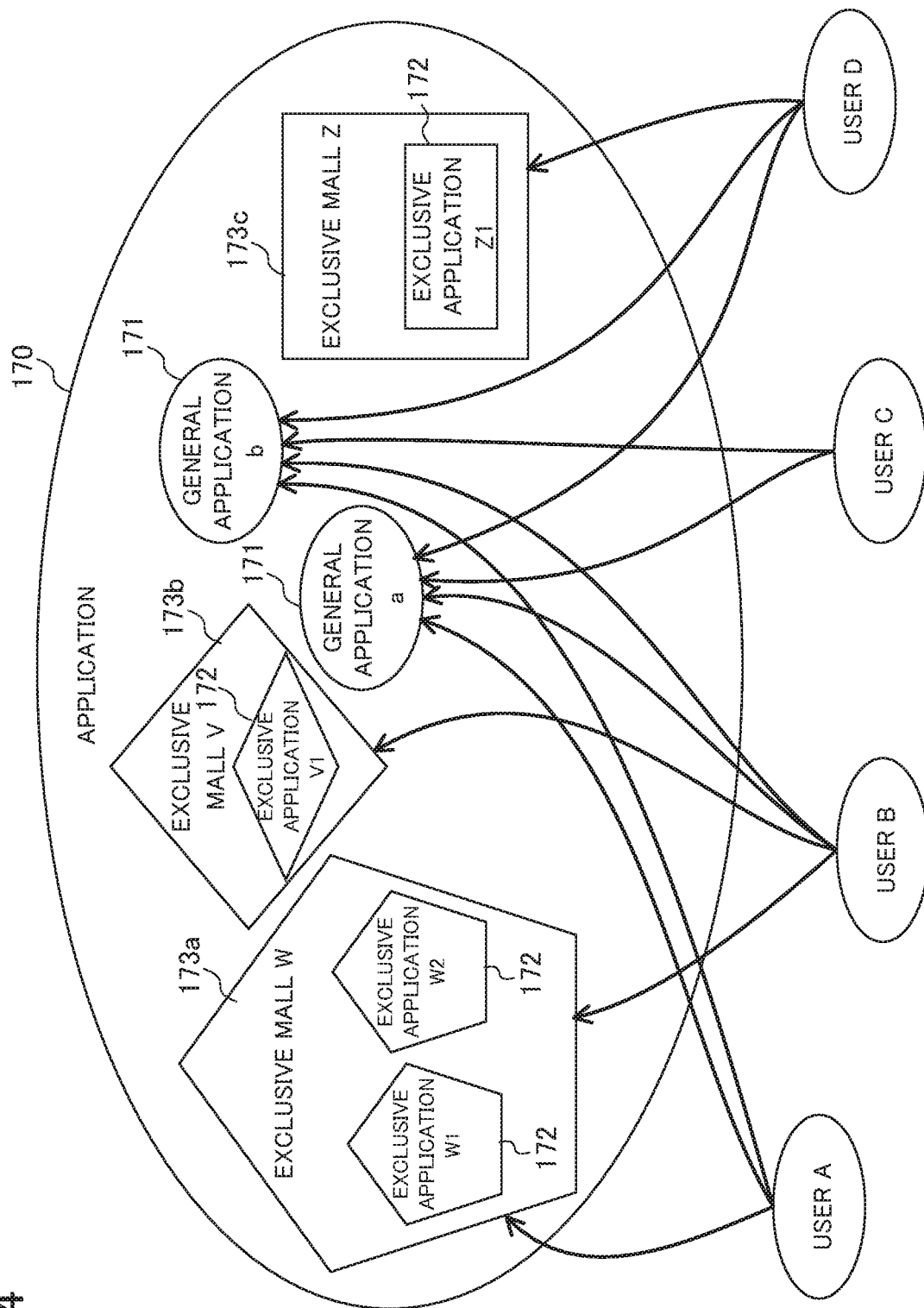
FIG. 4 is a diagram for describing a mall of the sales management server system according to the present embodiment.

The mall storage unit 123 is a storage area that stores information on a mall. Prior to description of the mall storage unit 123, a mall will be described. FIG. 4 is a schematic diagram for describing a mall of the sales management server system 100 according to the present embodiment. Here, a mall is a virtual store (a mall) which is virtually provided in the sales management server system 100 and which sells an application group including one or more applications among applications developed by a specialized dealer such as a machine tool manufacturer, for example. A mall is a component unique to B2B since the present invention is directed to B2B. The mall is correlated with an application group including one or more applications among applications sold in the mall only. Predetermined users only can access the mall.

An application 170 illustrated in FIG. 4 illustrates a portion of applications stored in the application storage unit 121 of the sales management server system 100. The application 170 includes a general application 171 and an exclusive application 172 (also referred to as a "mall application"). The general application 171 is an application which can be loaded into the edge server 200 by any end user having a user ID and which can be accessed in the sales management server system 100 (which is not included in any mall). Moreover, the exclusive application 172 is an application which is included in a predetermined mall and which can be loaded by a specific user only who is authorized to access the mall. The exclusive application 172 can be accessed in the sales management server system 100 by a user only who is authorized to access the mall. The exclusive application 172 is an application which has been created and/or is being developed by a higher intermediary dealer such as a machine tool manufacturer, for example. A user (that is, a user who is authorized to access a predetermined mall) who is authorized to browse, purchase, or distribute exclusive applications 172 correlated with the predetermined mall may be set uniquely by a higher intermediary dealer (an administrator thereof) such as a machine tool manufacturer correlated with each of exclusive malls 173 (exclusive malls 173a to 173c illustrated in FIG. 4). By doing so, it is possible to secure confidentiality such that users, even an operating company, other than a user who is authorized to access a mall cannot access the exclusive application 172 correlated with the mall (that is, cannot even browse applications included in the mall). For example, it is particularly effective in making the specification of applications in development confidential to users other than a specific user.

In the example illustrated in FIG. 4, user A is given an authorization to access the exclusive mall 173a and can browse the exclusive application 172 included in the exclusive mall 173 in addition to the general application 171. Moreover, user B is given an authorization to access the exclusive mall 173a and the exclusive mall 173b and can browse the exclusive application 172 included in the exclusive malls 173a and 173b in addition to the general application 171. On the other hand, user C is not authorized to access the exclusive mall 173 and can browse the general application 171 only. User D is given an authorization to access the exclusive mall 173c and can browse the exclusive application 172 included in the exclusive mall 173c in addition to the general application 171. Here, a correlation between the exclusive mall 173 including the exclusive application 172 and a higher intermediary dealer such as a machine tool manufacturer is set in advance and is stored in the mall storage unit 123.

By providing the application sales management system 1000 with a grouping function using such a mall, an higher intermediary dealer can provide applications developed by itself (or applications in development) to only end users who are customers thereof for browsing or sales purposes. Moreover, the higher intermediary dealer may not be also known to an operating company since the higher intermediary dealer manages applications included in the exclusive mall 173. Furthermore, since each user can access (browse, purchase, or distribute) the exclusive application 172 only included in the exclusive mall 173 correlated with the user ID thereof, each user has no way to know the presence of the exclusive application 172 included in the exclusive mall 173 which is not correlated with the user ID thereof.

As described above, the mall storage unit 123 stores the name of a mall, an administrator ID for identifying an administrator (for example, an administrator of the mall in the higher intermediary dealer such as a machine tool manufacturer), and an authorized user ID or the like for identifying a user who is authorized to access the mall, which is set by the administrator of the mall in correlation with a predetermined mall ID for identifying the mall. Moreover, the mall storage unit 123 may store a description on an application group included in the mall and/or an application ID for identifying applications included in the mall, the number of applications, and the like in correlation with the mall ID.

[Modification]

In this embodiment, although the exclusive application 172 included in the exclusive mall 173 has been described, an application to which access is restricted is not limited thereto. For example, an administrator ID and an authorized user ID may be set for each application so that an access restriction may be applied to these respective applications. More specifically, by adding the items of an administrator ID and an authorized user ID, for example, to the application storage unit 121, it is possible to secure confidentiality of the application to persons other than an administrator and an authorized user similarly to the exclusive mall 173.

<Distribution Management Storage Unit 124>

The distribution management storage unit 124 is a storage area that stores information on an application distributed to an arbitrary edge server 200 in correlation with a distribution destination edge server 200. The distribution management storage unit 124 illustrated in FIG. 3 stores the distributed application and the distribution destination edge server 200 in correlation. The distribution management storage unit 124 stores a distribution management record in which an edge server ID for identifying the distribution destination edge server 200 and an application ID for identifying a distributed application are used as retrieval keys and data including an edge server ID of the distribution destination edge server 200 and an application ID of the distributed application is used as a retrieval key (a composite key). In addition to the retrieval keys, the distribution management record stores data for managing a distributed application such as a serial number (a license key) of the distributed application, a license, a purchase date, a distribution date, a next contract renewal date, a next contract renewal notification date, a next contract renewal notification destination address, and a notification completion flag.

The serial number (a license key) is a serial number corresponding to a purchased application. The license is information on the edge device 300 which is authorized to perform connection and/or input/output to the application in relation to the license of an application distributed to the edge server 200. The purchase date is the date on which a serial number of the application is notified of. The distribution date is the date on which the application is distributed to the edge server 200. The next contract renewal date is the next contract scheduled date when the present license contract is continuously maintained. The next contract renewal notification date is a candidate date on which a confirmation notification whether the present license contract is continuously maintained is transmitted to a specialized dealer (an intermediary dealer) who is a purchaser of the application and/or a license destination end user of the application. The next contract renewal notification destination address is the address of the terminal 400 of a specialized dealer (an intermediary dealer) who is a purchaser of the application and/or a license destination end user of the application and/or an email address of a specialized dealer (an intermediary dealer) who is a purchaser of the application and/or a license destination end user of the application. The notification completion flag is a flag indicating whether a confirmation notification on whether a present license contract is continuously maintained or not is transmitted to a specialized dealer (an intermediary dealer) who is a purchaser of the application and/or the license destination end user of the application, and when the notification is transmitted, the flag is set to ON, for example, in order to indicate that a notification has been transmitted.

By doing so, users can easily retrieve information on the edge server 200 to which each application has been distributed and when the contract of the application is to be renewed in the edge server 200. Moreover, users can easily retrieve information on which application and when the contract of the application is renewed among applications distributed to each of the edge servers 200. Furthermore, a confirmation notification of the renewal of the contract of an application can be transmitted to the next contract notification destination address (for example, the terminal 400 and/or the email address or the like) on the next contract renewal notification date previous to the next contract update date for each application and/or each edge server 200. Next, the respective functional units of the control unit 110 illustrated in FIG. 2 will be described.

<Browsing Information Providing Unit 111>

The browsing information providing unit 111 has functions corresponding to an application product information providing unit and a sales price information providing unit. More specifically, the browsing information providing unit 111 provides application information (application product information) that an end user or a specialized dealer (an intermediary dealer) can browse in response to a browse request for application information (application product information) from the end user or the specialized dealer (an intermediary dealer) or the like, received from the terminal 400. The browsing information providing unit 111 may extract application product information on an application (the general application 171) provided to all logged-in users by referring to the application storage unit 121 and provide the application product information to the terminal 400.

[Browsing of Mall Application]

A case in which an authorization to access a predetermined mall is set to a logged-in user will be described. In this case, first, the browsing information providing unit 111 may provide mall information in which an access authorization is set to a logged-in user to the terminal 400 in a list form. More specifically, the browsing information providing unit 111 acquires a mall ID in which an access authorization is set to the user by referring to the mall storage unit 123. The browsing information providing unit 111 acquires a mall name, an administrator name of the mall, and the number of applications included in the mall from the mall storage unit 123 on the basis of the acquired mall ID and provides the mall information to the terminal 400 in a list form on the basis of the acquired data. The browsing information providing unit 111 may provide information on the exclusive application 172 included in an application group correlated with a mall selected via the terminal 400 in a list form. More specifically, the browsing information providing unit 111 may extract application product information of the exclusive application 172 by referring to the application storage unit 121 and provide the application product information to the terminal 400.

As another processing method for providing the application product information of the exclusive application 172 correlated with the mall, first, the browsing information providing unit 111 may specify a mall ID including an authorized user ID and an administrator ID on the basis of the user ID included in a received browse request by referring to the mall storage unit 123. When the mall ID is specified, the browsing information providing unit 111 may extract the application product information of the exclusive application 172 correlated with the specified mall ID by referring to the application storage unit 121 and provide the application product information to the terminal 400. In this manner, when an authorization to access a predetermined mall is set to a logged-in user, the browsing information providing unit 111 may provide first the mall information in which an access authorization is set to the user and then provide the information on the general application 171. The browsing information providing unit 111 may provide the general application 171 and the exclusive application 172 which is a mall application simultaneously.

[Browsing of Price Information]

The browsing information providing unit 111 provide price information corresponding to a user level set in advance to an end user or a specialized dealer (an intermediary dealer) in response to an inquiry or browsing of price information (application sales price information) of an application from the end user or the specialized dealer (an intermediary dealer), received from the terminal 400. Specifically, end user price information only is provided to the end user whereas end user price information and wholesale price information for the specialized dealer (an intermediary dealer) are provided to the specialized dealer (an intermediary dealer) or the like. Due to this, the browsing information providing unit 111 checks the user level of a user corresponding to the user ID included in the received browse request by referring to the user storage unit 122.

Here, the user level and the provided price information will be described. FIG. 5 is a diagram illustrating an example of a correspondence table 150 between a user level and price information according to the present embodiment. When the user of the terminal 400 is an end user, the browsing information providing unit 111 extracts the price information corresponding to ch1 as browsable price information. When the user of the terminal 400 is a lower intermediary dealer, the browsing information providing unit 111 extracts the price information corresponding to ch2 as browsable price information. When the user of the terminal 400 is a higher intermediary dealer, the browsing information providing unit 111 extracts the price information corresponding to ch3 as browsable price information. Here, when the user of the terminal 400 is a lower intermediary dealer or a higher intermediary dealer, as illustrated in the correspondence table 150, the price information corresponding to ch1 as well as the price information corresponding to the level thereof are extracted. The browsing information providing unit 111 generates a browsing screen 160 including the extracted application information and the price information of the application corresponding to the user level and provides the browsing screen 160 to the terminal 400. When a plurality of applications is extracted, the browsing information providing unit 111 may generate an application list screen and transmit the application list screen to the terminal 400. When a selection associated with one application is received from the terminal 400, the browsing information providing unit 111 may extract information on the selected application from the application storage unit 121 and generate the browsing screen 160.

Figure 6:
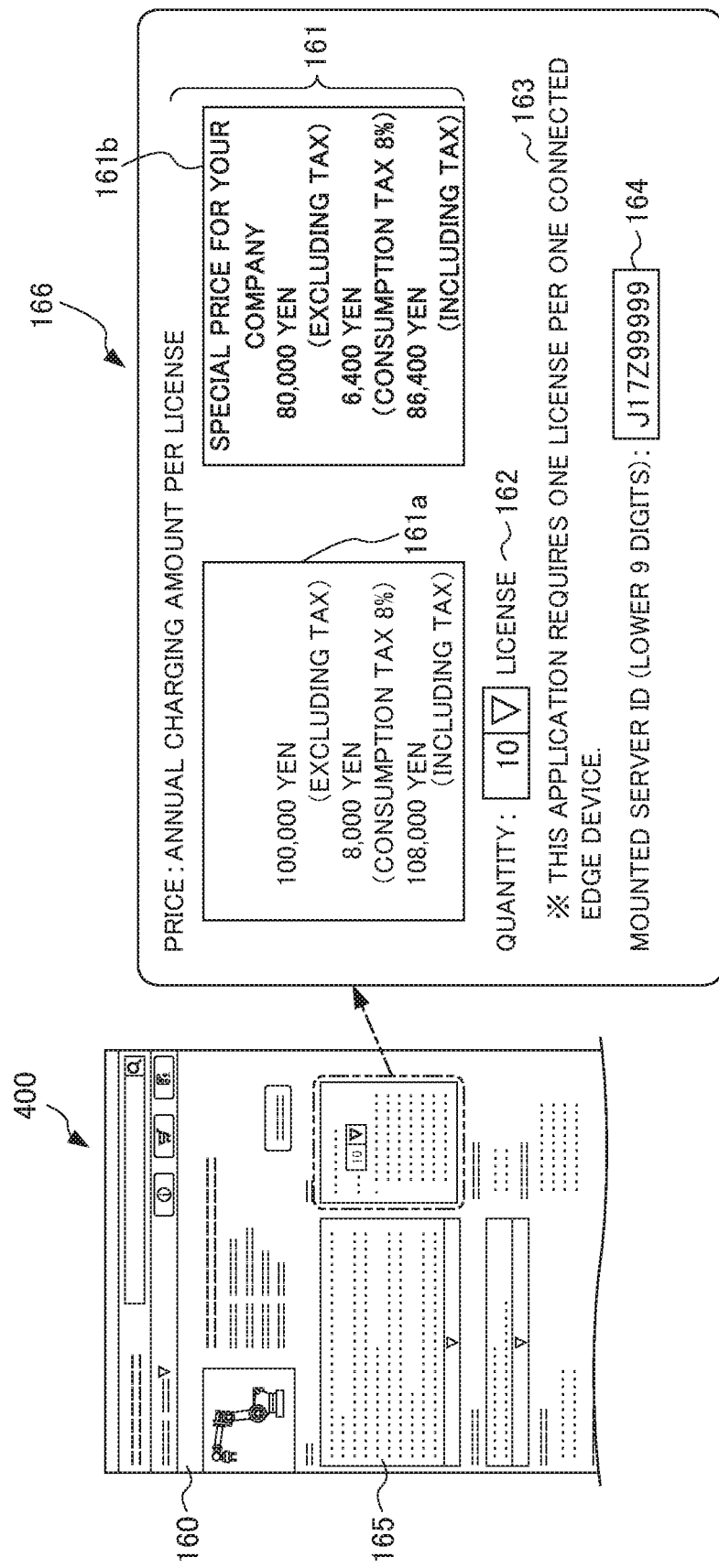
FIG. 6 is a diagram illustrating an example of a browsing screen displayed on a terminal according to the present embodiment.

FIG. 6 is a diagram illustrating an example of a browsing screen displayed on a terminal according to the present embodiment. The browsing screen 160 includes an application description 165 and a description 166 related to an application license, for example. The description 166 includes extracted price information 161, a license quantity 162, license description information 163, an edge server ID indicating portion 164 and provides these pieces of information collectively as information on a license. Since the browsing screen 160 includes the license description 166, each user can check information on a necessary license. The license quantity 162 is provided optionally. Here, FIG. 6 is an example displayed on the terminal 400 when the user is a higher intermediary dealer who has an ordering right. Therefore, the price information 161 indicates an end user price 161a corresponding to user level 1 (ch1) and a higher intermediary dealer price 161b corresponding to user level 3 (ch3). Moreover, the browsing screen 160 also serves as an ordering screen and displays the license quantity 162 and the edge server ID indicating portion 164 so that ordering can be realized. When the user is an end user who does not have an ordering right, the description 166 of the browsing screen 160 displays the price information 161 of the end user price 161a only and the license description information 163. When the user is a lower intermediary dealer who does not have an ordering right, the description 166 of the browsing screen 160 displays the end user price 161a as well as the lower intermediary dealer price corresponding to user level 2 (ch2).

<Ordering Processing Unit 112>

The ordering processing unit 112 has functions corresponding to a distribution authorization notification unit, an ordering screen output unit, and an application distribution information management unit. The ordering processing unit 112 outputs an ordering screen used for ordering an application to the terminal 400 in response to a request from a specialized dealer (an intermediary dealer) or an end user who is authorized to placing an online order, received from the terminal 400, for example. Due to this, the ordering processing unit 112 checks an ordering right of the user ID included in the received ordering request by referring to the user storage unit 122. The ordering processing unit 112 provides the ordering screen only when the user has the ordering right. Here, an ordering process may be executed by the terminal 400 of the higher intermediary dealer (user level 3) only, for example. For example, the ordering processing unit 112 may display a menu screen displayed when a user logs in so that, on the basis of the ID of the logged-in user, only the user who is a higher intermediary dealer, can select ordering. Upon receiving an ordering screen request, the ordering processing unit 112 may determine whether a subsequent process is to be performed on the basis of the user ID. As described above, as for a user having an ordering right, an ordering button or the like may be displayed on the browsing screen 160 so that the user can place an order.

Upon receiving, from the terminal 400, an application purchase request (that is, an edge server ID of the edge server 200 serving as a distribution destination of the application and a license request corresponding to the number of client target edge devices 300) from a user having an ordering right, the ordering processing unit 112 transmits the serial number (a license key) of the application corresponding to the purchase request to the terminal 400. Here, the serial number (a license key) is information for identifying an application to be distributed and indicating that distribution of the application is authorized. More specifically, the ordering processing unit 112 generates a serial number (a license key) of an application corresponding to the purchase request. The ordering processing unit 112 stores ordering processing data including an application ID, an edge server ID of a distribution destination edge server 200, a serial number (a license key) in the distribution management storage unit 124. The ordering processing unit 112 transmits a serial number (a license key) to the terminal 400 of the higher intermediary dealer that has transmitted the purchase request, for example. The serial number (a license key) received from the sales management server system 100 is displayed on the terminal 400 of the higher intermediary dealer that has executed this processing. By doing so, the application sales management system 1000 can notify the higher intermediary dealer that has transmitted the purchase request of the serial number (a license key) for distributing the purchased application.

A lower intermediary dealer or an end user who does not have an ordering right is not notified of the serial number (a license key) from the application sales management system 1000. Therefore, the application sales management system 1000 can prevent a lower intermediary dealer or an end user from downloading applications without paying for the applications. In the present embodiment, although the serial number (a license key) is described as an example of distribution authorization information, the distribution authorization information is not limited to the serial number (a license key).

It has been described that, when the ordering processing unit 112 receives an application purchase request transmitted from the terminal 400 of a user having an ordering right, the ordering processing unit 112 transmits the serial number (a license key) of the application corresponding to the purchase request to the terminal 400. However, a method in which the serial number (a license key) of the application is not transmitted immediately may be considered. For example, when the ordering processing unit 112 receives, from the terminal 400, an application purchase request from the terminal 400 of the user having an ordering right, the ordering processing unit 112 may transmit an email including an ID and a password for logging in an exclusive screen (not illustrated) displaying the serial number (a license key) of an application, for example, to the user who has transmitted the application purchase request as information related to a distribution authorization. When the user displays the exclusive screen and then logs in using the ID and the password described in the email, the ordering processing unit 112 displays the serial number (a license key) on the exclusive screen. The email may include a URL for displaying the exclusive screen in addition to the ID and the password. It is assumed that the address of an email corresponding to a user is registered in the storage unit 120. By doing so, for example, when a third party fraudulently uses the terminal 400 of the user having an ordering right, the serial number is left unknown to the third party and the system can be operated in a mechanism with improved security.

It has been described that the ordering processing unit 112 receives the application purchase request (that is, an edge server ID of the edge server 200 serving as a distribution destination of the application and a license request corresponding to the number of client target edge devices 300) from the user having an ordering right from the terminal 400. However, the application purchase request may not include a license request corresponding to the number of client target edge devices 300. In this case, the control unit 110 of the sales management server system 100 may designate a necessary license based on the number of client target edge devices 300 by referring to the edge server information stored in the storage unit 120 (the user storage unit 122) from the edge server ID.

<Distribution Processing Unit 113>

The distribution processing unit 113 has functions corresponding to an application distribution unit and an application distribution information management unit. Upon receiving an application distribution request together with the serial number (a license key) from the terminal 400, the distribution processing unit 113 specifies an application to be distributed and the distribution destination edge server 200 by referring to the distribution management storage unit 124 on the basis of the serial number (the license key) and distributes the application to the distribution destination edge server 200. More specifically, the distribution processing unit 113 specifies the edge server 200 that distributes the application from the serial number (the license key) in response to an application distribution request from an end user or a specialized dealer (an intermediary dealer), received from the terminal 400. The distribution processing unit 113 distributes the application corresponding to the serial number (the license key) and the license to the specified edge server 200. Here, the license is use authorization information on the edge device 300 serving as a client (that is, a connection and/or input/output target) of the application. The license may be distributed to the edge server 200 in a state of being included in the application. The license may be distributed to the edge server 200 separately from the application.

By doing so, an end user or a lower intermediary dealer can download a purchased application to the specified edge server 200. In this manner, since the distribution processing unit 113 specifies the application and the edge server 200 on the basis of the serial number (the license key) included in the distribution request, a specific user who knows the serial number only can transmit a distribution request. That is, even when a third party transmits a distribution request, an application is not distributed since the third party does not know the serial number. Since the serial number specifies the edge server 200 serving as the application distribution destination, even if a third party happens to know the serial number, the application cannot be distributed to a server other than the specified edge server 200.

<Mall Processing Unit 114>

The mall processing unit 114 has functions corresponding to a user setting unit and an administrator setting unit. The mall processing unit 114 performs processing on a mall. The mall processing unit 114 creates a mall on the basis of a creation request from the terminal 400 by a specialized dealer such as a machine tool manufacturer, for example, sets a user who is authorized to access the mall, and stores information on the mall in the mall storage unit 123.

[Generation of Mall]

The mall processing unit 114 generates a mall in correlation with an intermediary dealer ID on the basis of a creation request from the terminal 400 of a higher intermediary dealer by a specialized dealer such as a machine tool manufacturer. As described above, a mall is a virtual store that includes an application group including one or more applications and can be created for each application group. By doing so, a specialized dealer (a higher intermediary dealer) such as a machine tool manufacturer can designate a user who is authorized to access the application group for each of the related application groups. Due to this, a specialized dealer (a higher intermediary dealer) such as a machine tool manufacturer can segment users for each application group and can promote sales effectively.

A developer of an application may set an authorization to generate a mall and access the mall. Here, the developer is not limited to a specialized dealer such as a machine tool manufacturer but may be an end user such as an automobile company. Moreover, the developer may be a person who carried out entrusted development (in-house development) on the basis of a request from a specialized dealer such as a machine tool manufacturer.

[User Authorized to Access Mall]

More specifically, the mall processing unit 114 correlates a mall created on the basis of a creation request from a specialized dealer (a higher intermediary dealer) such as a machine tool manufacturer with a user ID authorized to access the mall. For example, the mall processing unit 114 may correlate the exclusive mall 173 with a user authorized to access the mall on the basis of an input from the terminal 400 of a specialized dealer (a higher intermediary dealer) such as a machine tool manufacturer using a mall setting screen or the like (not illustrated). For example, the terminal 400 of the higher intermediary dealer selects a user registration to the exclusive mall 173, for example, from a menu screen (not illustrated). By doing so, the mall processing unit 114 can add a user ID of a user authorized to access to an exclusive mall correlated with a user ID indicating an administrator of the higher intermediary dealer.

As described above, by providing an application grouping function using a mall, a specialized dealer (a higher intermediary dealer) such as a machine tool manufacturer can sell applications developed by itself or in development to end users who are customers thereof. Moreover, the specialized dealer (a higher intermediary dealer) such as a machine tool manufacturer manages the content of the exclusive mall 173 by itself. Due to this, it is possible to secure confidentiality such that users, even an operating company, other than a user who is authorized to access a mall cannot access the exclusive application 172 correlated with the mall (that is, cannot browse applications included in the mall). Moreover, a user who is authorized to access the mall can obtain application information more preferentially than other users who are not authorized to access the mall. Due to this, a user who is authorized to access the mall can use data indicating the operation state related to the edge device 300, data indicating the production state, data indicating the quality state of a product, and data indicating the operating state, for example, earlier than other users. For example, it is particularly effective for the user to obtain information on applications in development earlier than other users.

<Contract Renewal Processing Unit 115>

The contract renewal processing unit 115 has a function corresponding to a contract renewal notification unit. The contract renewal processing unit 115 transmits a notification for renewing the contract of an application downloaded to the edge server 200 to a specialized dealer (an intermediary dealer) who is a purchaser of the application and/or an end user of a license destination of the application, for example, by referring to the distribution management storage unit 124. The terminal notified of by the contract renewal processing unit 115 may be the terminal 400 of a specialized dealer (an intermediary dealer) who is a purchaser of the application and/or the end user of a license destination of the application and may be another terminal (for example, a portable terminal) of a specialized dealer (an intermediary dealer) who is a purchaser of the application and/or the end user of a license destination of the application. As for a notification method, the notification may be displayed on the menu screen and may be transmitted via an email or the like, for example. More specifically, the contract renewal processing unit 115 extracts an edge server ID and an application ID of the edge server 200 of which the next contract renewal notification date has arrived and which is not notified of by a notification completion flag by referring to the distribution management storage unit 124 at predetermined timings (for example, once a week or once a month). The contract renewal processing unit 115 notifies a specialized dealer (an intermediary dealer) who is a purchaser of the application and/or an end user corresponding to the edge server ID of the edge server 200 of a license destination of the application of the fact that renewal of the contract of the application corresponding to the application ID is necessary. Therefore, the contract renewal processing unit 115 can prevent omission of the contract renewal of the user and cause the user to update the contract without forgetting.

The communication unit 130 is a communication control device that transmits and receives data to and from an external device (for example, the edge server 200, the terminal 400, and the like) via the network N1.

Figure 7A:
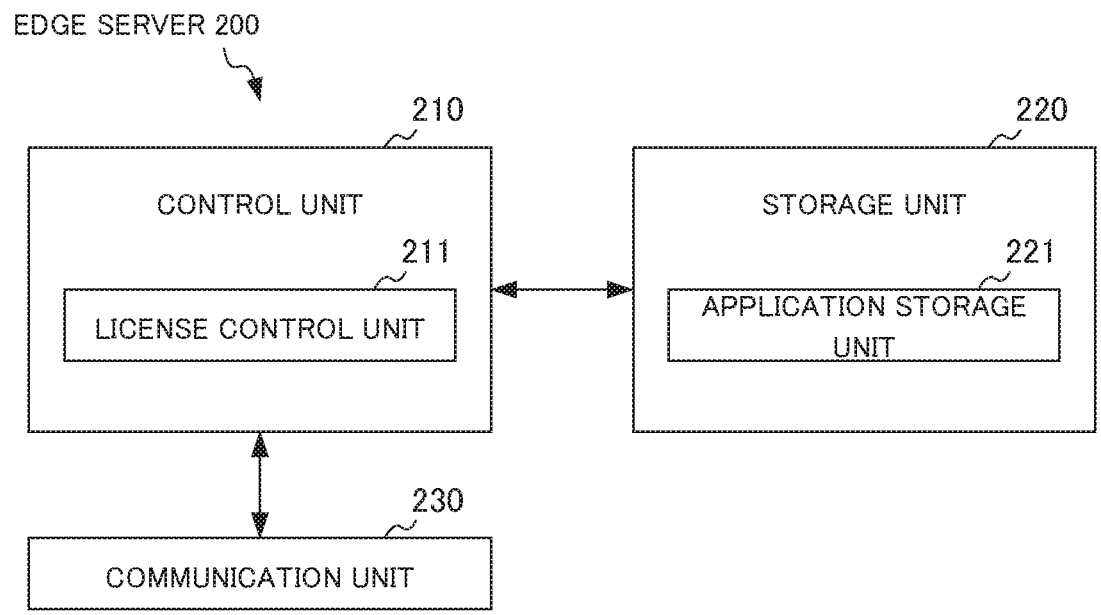
FIG. 7A is a functional block diagram of an edge server according to the present embodiment.

Next, a configuration of the edge server 200 will be described. FIG. 7A is a functional block diagram of the edge server 200 according to the present embodiment. The edge server 200 includes a control unit 210, a storage unit 220, and a communication unit 230. The control unit 210 is a CPU, for example, and controls the edge server 200 in an integrated manner by executing various programs stored in the storage unit 220 and applications downloaded from the sales management server system 100.

In the present embodiment, the control unit 210 includes a license control unit 211 as a functional unit based on an application stored in the storage unit 220. The license control unit 211 controls connection and/or input/output to an application and the edge device 300 on the basis of a license related to the application.

More specifically, when an application stored in the application storage unit 221 is activated by the control unit 210, the license control unit 211 reads a license corresponding to the application. The license control unit 211 specifies an edge device 300 which is authorized as a client which is an input/output destination of the application on the basis of the read license. More specifically, for example, the license control unit 211 determines whether the edge device 300 that requests connection to the application satisfies requirements defined in the license on the basis of the license. When the edge device 300 satisfies the requirements defined in the license, the license control unit 211 authorizes the request for connection to the application and controls input/output to the application. When the edge device 300 does not satisfy the requirements defined in the license (for example, exceeds the license), the license control unit 211 rejects the request for connection to the application and prohibits input/output to the application. By doing so, the license control unit 211 can control connection and/or input/output between the edge device 300 and the application distributed to the edge server 200 according to the distributed license.

The storage unit 220 includes an application storage unit 221 that stores applications to be executed by the control unit 210. The application storage unit 221 stores applications distributed from the sales management server system 100 and licenses related to the applications. The communication unit 230 is a communication control device that transmits and receives data to and from an external device (for example, the sales management server system 100 and the like) via the network N1 and transmits and receives data to and from an external device (the edge device 300) via the network N2.

[Modification]

Although it has been described that the edge server 200 stores applications and licenses related to the applications in the application storage unit 221, applications and licenses may be distributed from the sales management server system 100 and be stored separately. Next, a configuration of an edge server 200-2 that stores applications and licenses separately will be described.

Figure 7B:
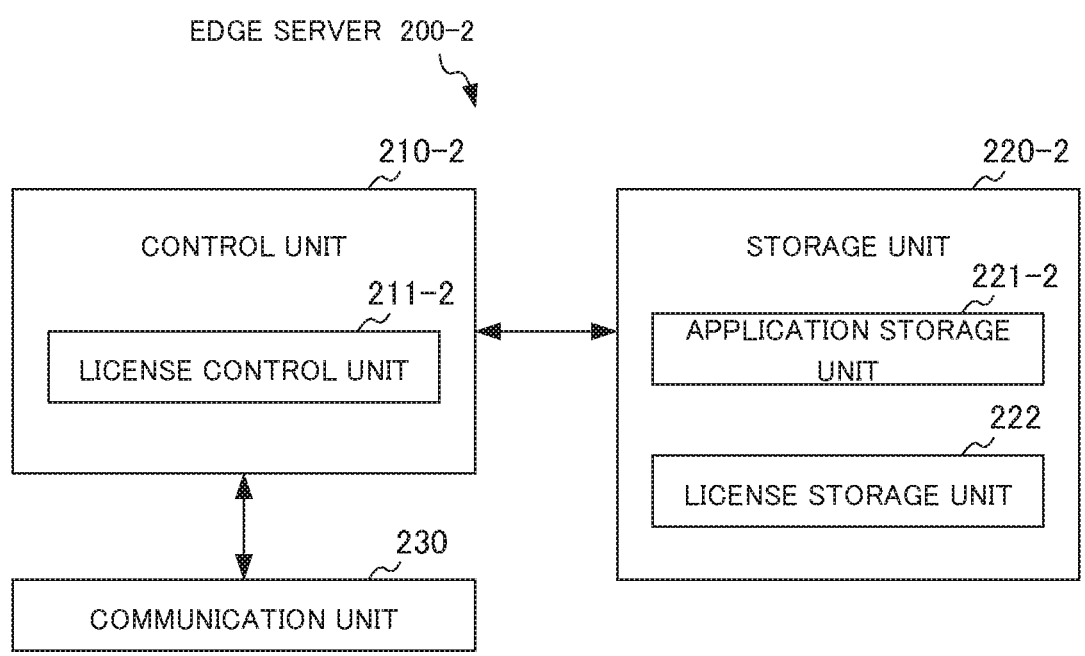
FIG. 7B is a functional block diagram of an edge server according to a modification of the present embodiment.

FIG. 7B is a functional block diagram of the edge server 200-2 according to a modification of the present embodiment. The edge server 200-2 includes a control unit 210-2, a storage unit 220-2, and a communication unit 230. The control unit 210-2 includes a license control unit 211-2 as a functional unit based on the application stored in the storage unit 220-2. The license control unit 211-2 controls connection and/or input/output between the application and the edge device 300 on the basis of the license related to the application stored in a license storage unit 222.

More specifically, when an application stored in the application storage unit 221-2 is activated by the control unit 210-2, the license control unit 211-2 extracts a license corresponding to the application from the license storage unit 222. The license control unit 211-2 specifies the edge device 300 authorized as a client which is an input/output destination of the application on the basis of the extracted license, authorizes the request for connection to the application so as to satisfy the requirements defined in the license, and controls input/output to the application. By doing so, the license control unit 211-2 can control connection and/or input/output between the edge device 300 and the application distributed to the edge server 200 according to the distributed license.

The storage unit 220-2 includes an application storage unit 221-2 that stores an application to be executed by the control unit 210-2 and the license storage unit 222. The application storage unit 221-2 stores an application distributed from the sales management server system 100. The license storage unit 222 stores a license related to the application distributed simultaneously with the application from the sales management server system 100.

Hereinabove, the functional blocks included in the sales management server system 100 and the edge server 200 have been described. The respective devices included in the application sales management system 1000 can be realized by hardware, software, or a combination thereof. Here, a device being realized by software means that a computer reads and executes a program (an application) whereby the device is realized. As a specific example, the sales management server system 100 and the edge server 200 can be realized by incorporating a program (an application) for realizing the present embodiment in an ordinary server.

Figure 8:
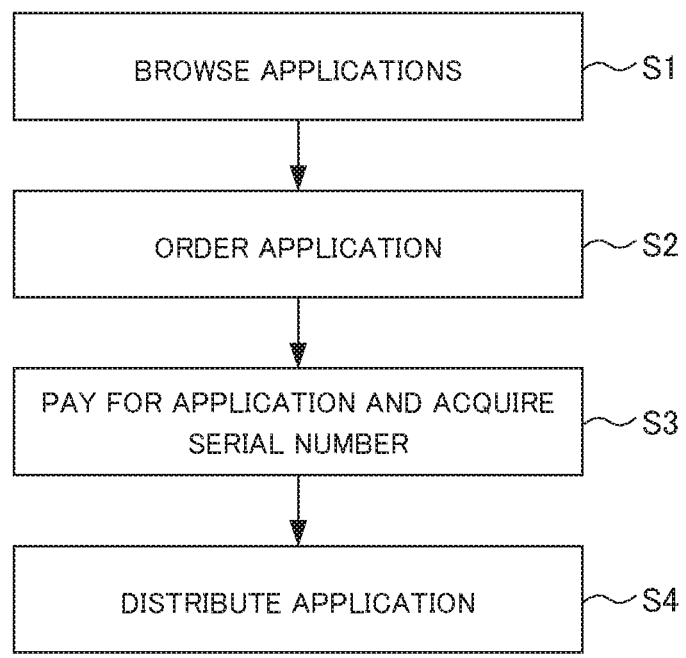
FIG. 8 is a diagram illustrating an overview of the flow of an application purchase process including the processing of the application sales management server according to the present embodiment.

Next, the flow of a process of purchasing an application using the application sales management system 1000 on the basis of a conventional business practice will be described on the basis of FIG. 8. FIG. 8 is a diagram illustrating an overview of the flow of an application purchasing process including the process of the application sales management system 1000 according to the present embodiment. In the following description, a case in which an end user, a lower intermediary dealer, and a higher intermediary dealer purchase an application distributed to the edge server 200 of the end user using the application sales management system 1000 will be described as an example. In this example, unless particularly stated otherwise, a case in which three levels including an end user (user level 1), a lower intermediary dealer (user level 2) such as a system integrator, and a higher intermediary dealer (user level 3) such as a machine tool manufacturer are set as the user level will be described. However, two or more lower intermediary dealers and two or more higher intermediary dealers may be provided, and one intermediary dealer including a lower intermediary dealer and a higher intermediary dealer may be provided. Unless particularly stated otherwise, although the ordering right is set to the higher intermediary dealer (user level 3), the ordering right may be set to the lower intermediary dealer (user level 2) and/or the end user (user level 1).

In step S1 (hereinafter step S will be referred to simply as "S") in FIG. 8, each user (an end user and an intermediary dealer) browses applications. In S2, when a user purchases an application, the user orders the application. In S3, the user acquires a serial number of the application on condition that the user pays for the cost for purchasing the application, for example. In S4, the user distributes the application to the edge server 200 using the serial number.

Figure 9:
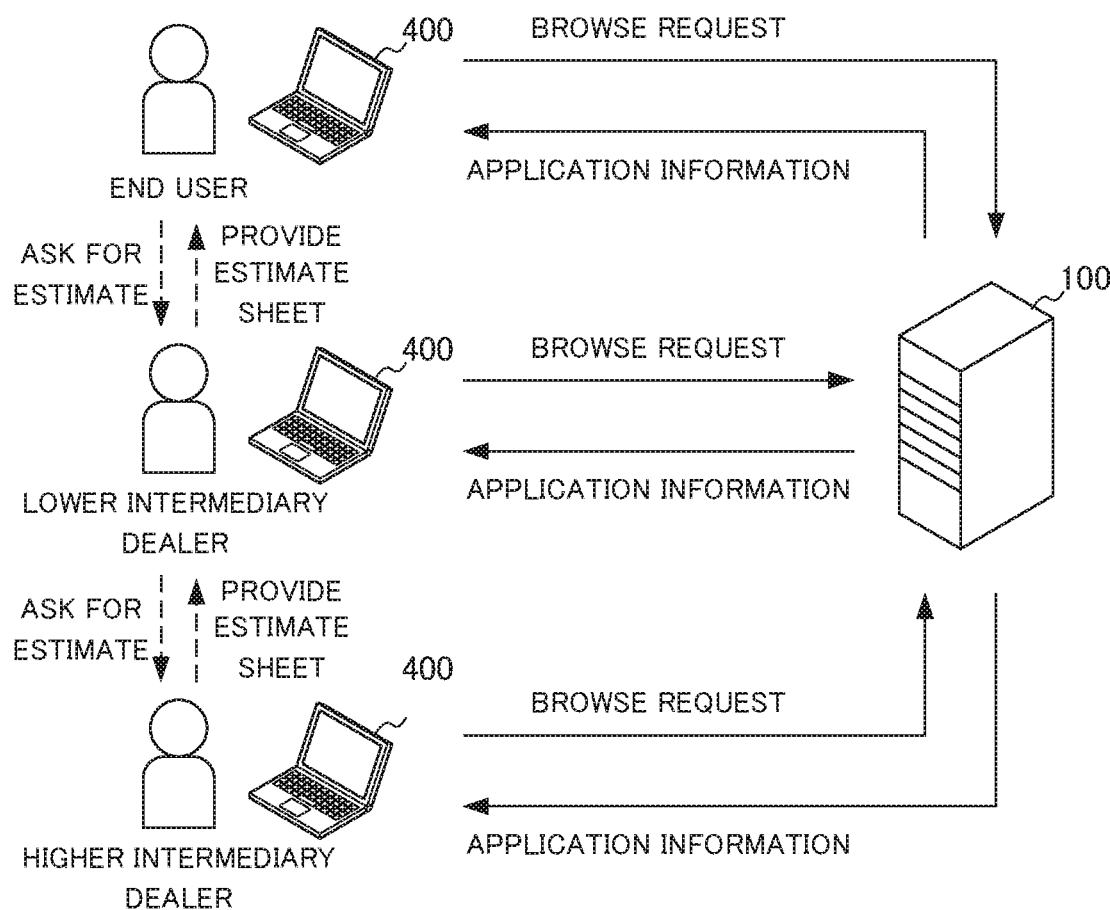
FIG. 9 is a diagram for describing how applications are browsed using the sales management server system according to the present embodiment.
Figure 10:
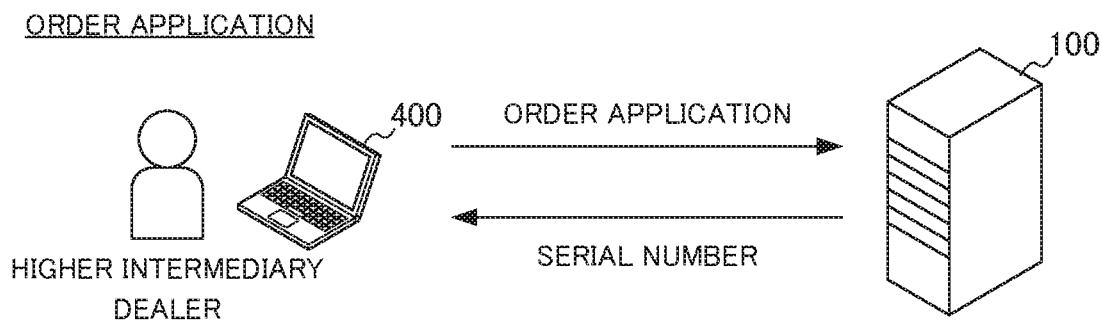
FIG. 10 is a diagram for describing how applications are ordered using the sales management server system according to the present embodiment.
Figure 11:
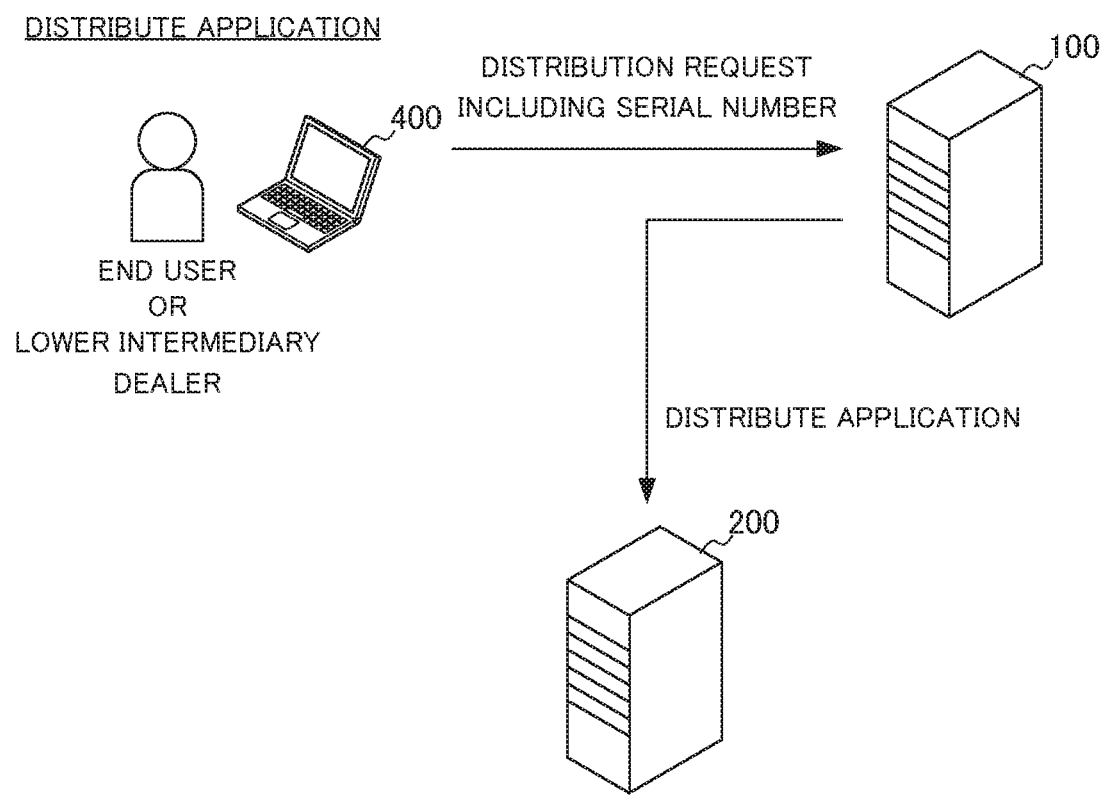
FIG. 11 is a diagram for describing how applications are distributed using the sales management server system according to the present embodiment.

Next, the relationship between each user and the application sales management system 1000 in each step will be described. FIG. 9 is a diagram for describing how applications are browsed using the sales management server system 100 according to the present embodiment. FIG. 10 is a diagram for describing how applications are ordered using the sales management server system 100 according to the present embodiment. FIG. 11 is a diagram for describing how applications are distributed using the sales management server system 100 according to the present embodiment.

(1) Browsing of Applications

In correspondence to S1 in FIG. 8, as illustrated in FIG. 9, when purchasing applications, an end user, a lower intermediary dealer, and a higher intermediary dealer access the sales management server system 100 from the respective terminals 400 to transmit an application information browse request.

The end user browses application information output from the terminal 400 as a response to the browse request. After browsing the application information, the end user determines an application to be purchased on the basis of a configuration of the edge device 300 provided in a plant facility thereof, the price information of the application, and the like. After that, the end user asks for an estimation to a lower intermediary dealer who is in direct transaction with the end user according to a conventional business practice. The end user may ask for competitive bids to a plurality of lower intermediary dealers. The estimation is not the target of processing of the application sales management system 1000. The end user receives an estimate sheet from the lower intermediary dealer. The end user determines an application to be purchased.

The lower intermediary dealer browses the application information output to the terminal 400 as a response to the browse request in response to an estimation request from the end user or in order to find an application useful for the end user. Moreover, the lower intermediary dealer receives an estimation request from the end user and asks for an estimation to a higher intermediary dealer who is in direct transaction. The lower intermediary dealer receives an estimate from the higher intermediary dealer. The lower intermediary dealer creates an estimate for the end user and provides an estimate sheet to the end user. Furthermore, the lower intermediary dealer may provide information on an application useful for the end user to the end user.

The higher intermediary dealer browses the application information output to the terminal 400 as a response to the browse request in response to the estimation request from the lower intermediary dealer or in order to find an application useful for the lower intermediary dealer. Moreover, the higher intermediary dealer receives an estimation request from the lower intermediary dealer, creates an estimate sheet for the lower intermediary dealer, and provides the estimate sheet to the lower intermediary dealer. Furthermore, the higher intermediary dealer may provide information on an application useful for the lower intermediary dealer to the lower intermediary dealer.

(2) Ordering of Applications

In correspondence to S2 in FIG. 8, the end user places an order for an application to the lower intermediary dealer when the end user has decided to purchase an application according to the received estimate sheet. The lower intermediary dealer receives an ordering request from the end user and places an order for an application to the higher intermediary dealer. In this case, the ordering source user transmits an application to be ordered and an edge server ID of the edge server 200 that downloads the application to an ordering destination. Here, the edge server ID is identification information for identifying the edge server 200. The ordering request is not the target of processing of the application sales management system 1000.

As illustrated in FIG. 10, a higher intermediary dealer having an ordering right accesses the sales management server system 100 from the terminal 400, designates an edge server ID, and places an order for the application. When an order is placed, the sales management server system 100 transmits the serial number of the ordered application to the terminal 400 of the higher intermediary dealer. Here, the sales management server system 100 may transmit the serial number of the ordered application directly to the terminal 400 of the higher intermediary dealer as a response to the ordering process. This is because the higher intermediary dealer who is the user who can place an order using the application sales management system 1000 is a company whose credit is trusted by an operating company.

When an order is placed, the sales management server system 100 may transmit an email including an ID and a password for logging in an exclusive screen (not illustrated) for displaying the serial number of an application, for example, on another terminal (or the terminal 400) of the higher intermediary dealer to the higher intermediary dealer. In this manner, the serial number of the ordered application may not be informed of directly by the higher intermediary dealer as a response to the ordering process. When a user logs in from the exclusive screen using the ID and the password included in the email, the sales management server system 100 displays the serial number on the exclusive screen. The email may include a URL for displaying the exclusive screen in addition to the ID and the password for logging in the exclusive screen.

(3) Paying for Applications

In correspondence to S3 in FIG. 8, the higher intermediary dealer having received the serial number is paid for the application from the lower intermediary dealer and notifies the lower intermediary dealer of the serial number. Similarly, the lower intermediary dealer is paid for the application from the end user and notifies the end user of the serial number. Here, providing of the serial number from the higher intermediary dealer to the lower intermediary dealer and providing of the serial number from the lower intermediary dealer to the end user may be realized using an arbitrary means and may be realized appropriately using a facsimile, an email, a document, and the like, for example. Payment for the application by the lower intermediary dealer or the end user and the subsequent acquisition of the serial number related to the application are based on an existing technique and are not the target of the processing of the application sales management system 1000.

(4) Distribution of Applications

In correspondence to S4 in FIG. 8, as illustrated in FIG. 11, the end user being notified of the serial number or the lower intermediary dealer having been paid from the end user transmits a distribution request including the serial number to the sales management server system 100 from the terminal 400. When a distribution request is transmitted, the sales management server system 100 distributes an application corresponding to the serial number to the edge server 200. The edge server 200 stores the distributed application in the application storage unit 221.

Next, a process flow of the sales management server system 100 in the respective steps will be described. First, the flow of an application browsing process will be described. FIG. 12 is a flowchart illustrating a browsing information providing process of the sales management server system 100 according to the present embodiment.

In order to browse the application information, each user operates the terminal 400 to log in the sales management server system 100. Here, login is performed using an existing method, and user authentication is performed using such as a password management file including personal information of a user, an ID, a password, and the like, for example, to ascertain that the user is an authorized user. The user selects browsing of applications from the menu screen (not illustrated) displayed on the terminal 400. In S10, the browsing information providing unit 111 of the sales management server system 100 receives a browse request transmitted by the terminal 400. In S11, the browsing information providing unit 111 checks the user level of the user ID included in the received browse request by referring to the user storage unit 122. In S12, the browsing information providing unit 111 specifies a mall ID in which the received user ID is included in an authorized user ID or an administrator ID by referring to the mall storage unit 123.

In S13, the browsing information providing unit 111 extracts an application including the mall ID specified in S12 by referring to the application storage unit 121. The browsing information providing unit 111 extracts an application in which the mall ID is blank by referring to the application storage unit 121. In S14, the browsing information providing unit 111 extracts information on the extracted application from the application storage unit 121 and generates the browsing screen 160. In this case, the browsing information providing unit 111 extracts the price information corresponding to the user level ascertained in S11 from the application storage unit 121. In S15, the browsing information providing unit 111 transmits the generated browsing screen 160 to the terminal 400 that has transmitted the browse request. After that, the sales management server system 100 ends this process.

Next, the flow of an application ordering process will be described. FIG. 13A is a flowchart illustrating the ordering process of the sales management server system 100 according to the present embodiment. In FIG. 13A, a serial number is transmitted directly in response to an ordering request. In order to place an order for an application to be purchased, for example, a higher intermediary dealer having an ordering right operates the terminal 400 and selects ordering of an application from the menu screen (not illustrated) displayed on the terminal 400. In S20, the ordering processing unit 112 of the sales management server system 100 receives an ordering screen request transmitted by the terminal 400.

In S21, the ordering processing unit 112 transmits an ordering screen to the terminal 400 that has transmitted the request. The ordering screen may be similar to the browsing screen 160 illustrated in FIG. 6, for example. Here, when the control unit 110 of the sales management server system 100 designates a necessary license based on the number of client target edge devices 300 by referring to the edge server information stored in the storage unit 120 (the user storage unit 122) from the edge server ID, information on the number of licenses corresponding to the number of client target edge devices 300 is not displayed. The terminal 400 inputs information for ordering by referring to the ordering screen. The terminal 400 transmits a purchase request by selecting a button for placing an order included in the ordering screen, for example. By doing so, in S22, the ordering processing unit 112 receives a purchase request from the terminal 400.

In S23, the ordering processing unit 112 generates a serial number of an application corresponding to the purchase request. The ordering processing unit 112 stores data corresponding to respective items including the serial number in the distribution management storage unit 124. In S24, the ordering processing unit 112 transmits the serial number to the terminal 400 of the higher intermediary dealer who has transmitted the purchase request. After that, the ordering processing unit 112 ends this process.

[Modification]

In the above-described flowchart, although the serial number is transmitted directly in response to an ordering request, an ID and a password for logging in the exclusive screen for displaying the serial number may be transmitted. FIG. 13B is a flowchart illustrating an ordering process of the sales management server system 100 according to a modification of the present embodiment. S20 to S23 are similar to S20 to S23 of the flowchart in FIG. 13A. In S24a, the ordering processing unit 112 generates an ID and a password for logging in the exclusive screen. In S25a, the ordering processing unit 112 generates an email including the generated ID and password and transmits the email. When a user having received the email logs in the exclusive screen using the ID and the password included in the email, a serial number is displayed. Therefore, the user can know the serial number corresponding to the purchase request.

Next, the flow of an application distribution process will be described. FIG. 14 is a flowchart illustrating an application distribution process of the sales management server system 100 according to the present embodiment. In order to transmit an application distribution request, for example, an end user operates the terminal 400, selects distribution of applications, for example, from the menu screen (not illustrated) displayed on the terminal 400, inputs a serial number of an application to be distributed to the edge server 200 on a distribution screen (not illustrated) changed from the menu screen, and transmits a distribution request to the sales management server system 100.

In S30, the distribution processing unit 113 of the sales management server system 100 receives the distribution request from the terminal 400. Here, an end user may transmit the distribution request using the terminal 400 of the end user, or the lower intermediary dealer may transmit the distribution request using the terminal 400 of the lower intermediary dealer. S31, the distribution processing unit 113 specifies an application and the edge server 200 to which the application is distributed by referring to the distribution management storage unit 124 on the basis of the serial number included in the distribution request.

In S32, the distribution processing unit 113 distributes the specified application to the specified edge server 200. In this case, the distribution processing unit 113 sets a next contract renewal notification date on the basis of the calculated next contract renewal date and at an appropriate date (for example, one month before an expiration date). When an application is sold out (that is, when renewal of a contract is not necessary), the next contract renewal notification date is left blank. In S33, the distribution processing unit 113 transmits a notification of completion of distribution to the terminal 400 that has transmitted the distribution request when distribution of an application to the edge server 200 is completed. After that, the distribution processing unit 113 ends this process.

Next, the flow of an application renewal process will be described. FIG. 15 is a flowchart illustrating a contract renewal notification process of the sales management server system 100 according to the present embodiment. The sales management server system 100 executes the contract renewal notification process at predetermined timings (for example, once a week or once a month). In S40, the contract renewal processing unit 115 of the sales management server system 100 extracts an edge server ID and an application ID of which the next contract renewal notification date has arrived and which is not notified of by a notification completion flag by referring to the distribution management storage unit 124.

In S41, the contract renewal processing unit 115 notifies a user (an application purchaser and an application user) corresponding to the edge server ID of a fact that renewal of the contract of an application corresponding to the application ID is necessary using a notification destination address. After that, the contract renewal processing unit 115 ends this process.

Figure 17A:
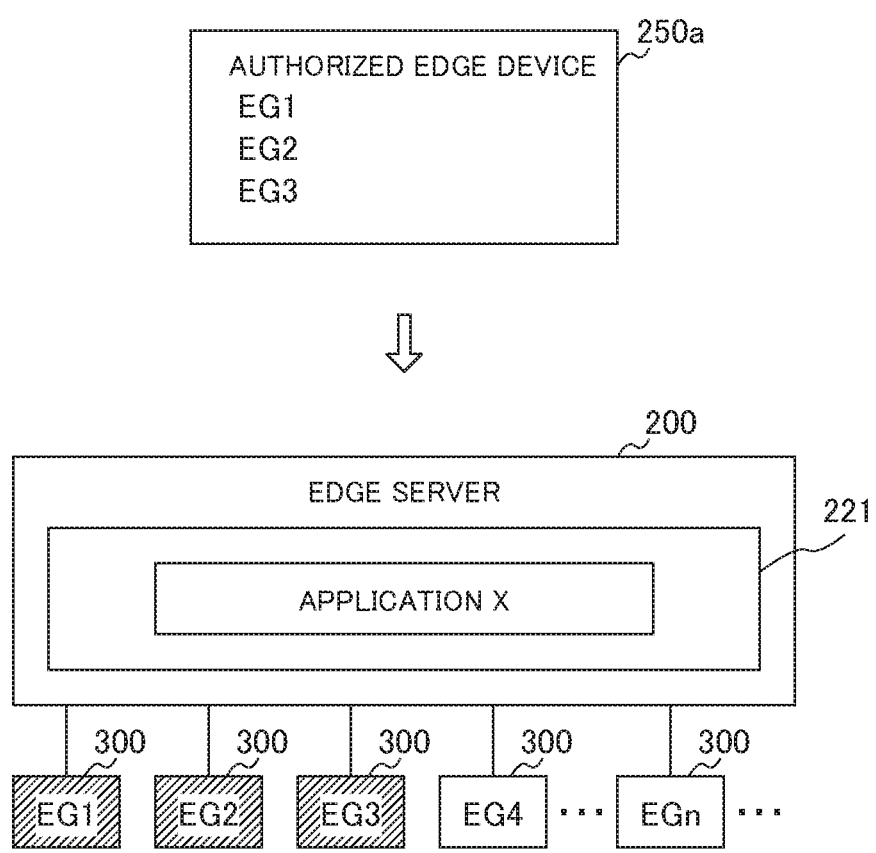
FIG. 17A is a diagram illustrating a specific example of an edge device of which the license is controlled by the edge server according to the present embodiment.

Next, a process flow in the edge server 200 in which a downloaded application is activated will be described. FIG. 16 is a flowchart illustrating a license control process of the edge server 200 according to the present embodiment. FIGS. 17A and 17B are diagrams illustrating a specific example of the edge device 300 of which the license is controlled by the edge server 200 according to the present embodiment.

In S50 in FIG. 16, the control unit 210 of the edge server 200 activates an application stored in the application storage unit 221. Activation of the application is performed at the start-up of a server when the edge server 200 is turned on, for example. In S51, the license control unit 211 reads the license 250 (licenses 250a and 250b) corresponding to the application. In the example illustrated in FIG. 17A, the license 250a of application X designates an authorized edge device 300. Specifically, the authorized edge device 300 includes "EG1", "EG2", and "EG3" and can be managed by an edge device ID for identifying each edge device 300, for example. In the example illustrated in FIG. 17B, the license 250b of application Y does not designate an authorized edge device 300 but indicates that "up to two devices can be connected concurrently".

In S52, the license control unit 211 designates an authorized edge device 300 on the basis of the read license 250. In the example illustrated in FIG. 17B, up to two edge devices 300 are designated as the edge device 300 which can establish connection to application Y. For example, when the edge devices 300 which have first established connection are "EG1" and "EG3", the license control unit 211 allows the two edge devices 300 to transmit data using application Y.

In S53, the license control unit 211 determines whether the edge device 300 corresponding to the received data is a designated device. In the case of FIG. 17A, if the edge device 300 having transmitted the received data is any one of "EG1", "EG2", and "EG3", the edge device 300 is a designated device, whereas if the edge device 300 corresponding to the received data is "EG4" or "EG5", the edge device 300 is not a designated device. Moreover, in the case of FIG. 17B, if the edge device 300 corresponding to the received data is "EG1" or "EG3", the edge device 300 is a designated device (up to two concurrently connected devices), whereas if the edge device 300 corresponding to the received data is any one of "EG2", "EG4", and "EG5", the edge device 300 is not a designated device (up to two concurrently connected devices). If the device is a designated device (S53: YES), the license control unit 211 proceeds to S54. On the other hand, if the device is not a designated device (S53: NO), the license control unit 211 proceeds to S55. In S54, the control unit 210 performs processing of applications using the received data.

In S55, the control unit 210 determines whether an application termination command has been received. The control unit 210 determines that an application termination command has been received when an operation of turning off the edge server 200 is received or an operation of forcibly terminating the application is received, for example. When an application termination command is received (S55: YES), the control unit 210 terminates the application. On the other hand, when an application termination command is not received (S55: NO), the license control unit 211 proceeds to S52. In the case of FIG. 17B, when the connection of the edge device 300 of "EG3" is cut and then, the connection of the edge device 300 of "EG2" is established, the license control unit 211 allows the two edge devices 300 of "EG1" and "EG2" to transmit data using application Y in S52. The methods of FIGS. 17A and 17B may be combined, and the largest number of edge devices 300 may be defined in the license, and the authorized edge device 300 may be designated within this range.

[Modification]

Figure 17C:
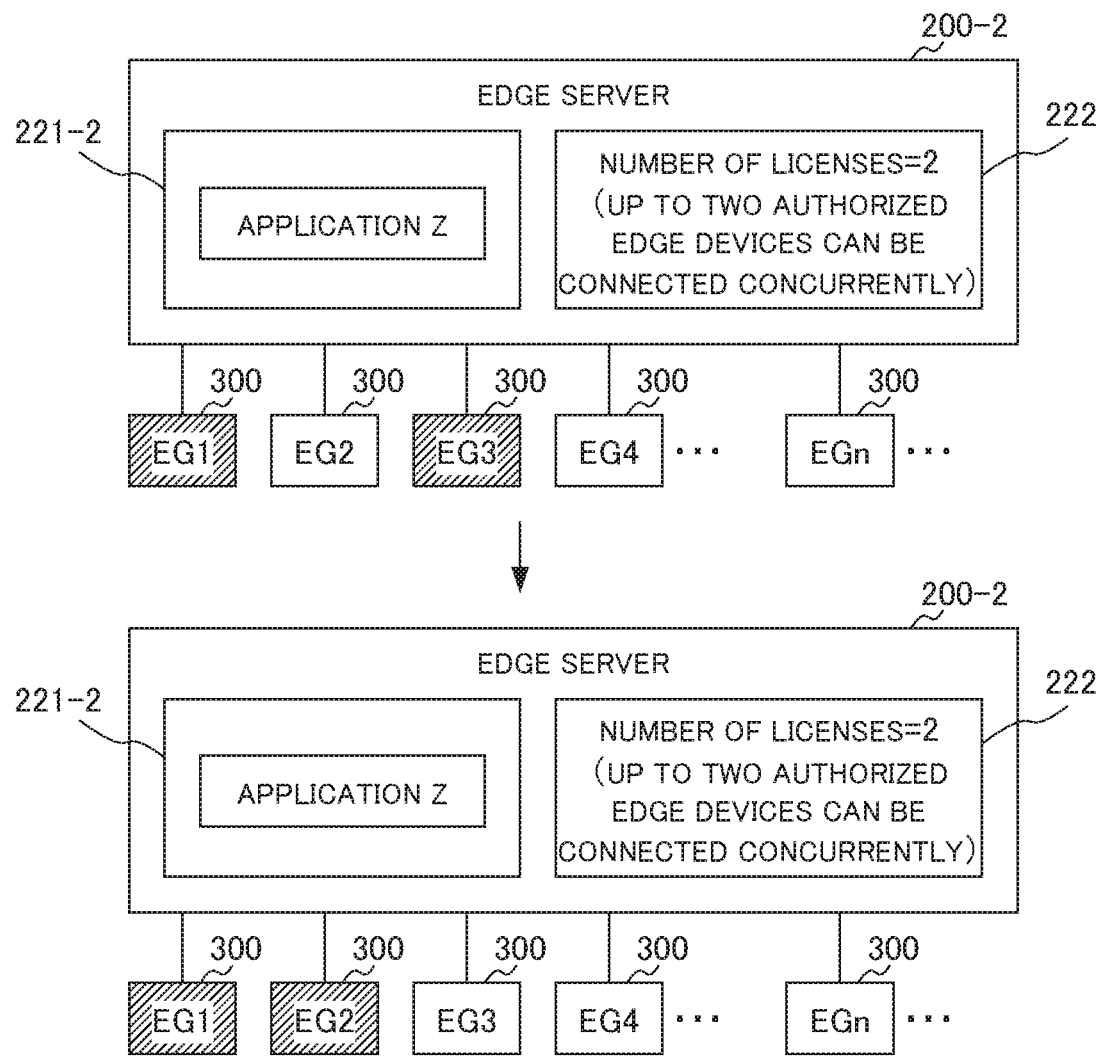
FIG. 17C is a diagram illustrating a specific example of an edge device of which the license is controlled by the edge server according to a modification of the present embodiment.

Next, the process in the edge server 200-2 in which a downloaded application operates will be described. FIG. 17C is a diagram illustrating a specific example of the edge device 300 of which the license is controlled by the edge server 200-2 according to a modification of the present embodiment. The process flow of the example illustrated in FIG. 17C is similar to that of FIG. 16 except for the followings. In the example illustrated in FIG. 17C, in the process corresponding to S51 in FIG. 16, the license control unit 211-2 extracts a license corresponding to an application from the license storage unit 222. In the example illustrated in FIG. 17C, the license of the license storage unit 222 of application Z does not designates an authorized edge device 300 but indicates that "up to two devices can be connected concurrently". Therefore, in the process corresponding to S52 in FIG. 16, the license control unit 211-2 sets the number of edge devices 300 which can establish connection to application Z to two on the basis of the extracted license. The methods of FIGS. 17A and 17C may be combined, the largest number of edge devices 300 may be defined in the license, and the authorized edge device 300 may be designated within this range.

In this way, the application sales management system 1000 can purchase and download an application to be operated in the edge server 200 from the sales management server system 100. In this case, since the sales management server system 100 control the executability of a process related to purchase of applications and the like on the basis of the user level and an ordering right of a user, it is possible to facilitate the purchase of applications using the application sales management system 1000 while making use of a conventional business practice.

The programs as well as the applications used in the present invention may be stored using various types of non-transitory computer readable media and be supplied to a computer. The non-transitory computer readable media include various types of tangible storage media. Examples of the non-transitory computer readable media include a magnetic recording medium (for example, a flexible disk, magnetic tape, or a hard disk drive), a magneto-optical recording medium (for example, a magneto-optical disk), a CD read only memory (CD-ROM), a CD-R, a CD-R/W, and a semiconductor memory (for example, a mask ROM, a programmable ROM (PROM), an erasable PROM (EPROM), a flash ROM, or a random access memory (RAM)). Moreover, the programs may be supplied to a computer in a form of various types of transitory computer readable media. Examples of transitory computer readable media include electrical signals, optical signals, and electromagnetic waves. The transitory computer readable media can supply programs to a computer via a wired communication path such as an electric wire and an optical fiber or a wireless communication path.

The above-described embodiment is a preferred embodiment of the present invention. However, the scope of the present invention is not limited to the embodiment only but the present invention can be embodied in various modifications without departing from the spirit of the present invention.

(Modification 1)

In the above-described embodiment, the number of edge devices 300 authorized as a client which is an input/output destination of an application distributed to the edge server 200 is the number of edge devices 300 communicably connected to the edge server 200, set by the license. However, the present invention is not limited thereto. For example, when a plurality of edge devices 300 is connected to the edge server 200 via a controller, the use of the plurality of edge devices 300 connected to the controller may be authorized using the controller as one license, and each of the plurality of edge devices 300 connected to the controller may be authorized as the controller as one license. Such control may be designated for respective applications.

(Modification 2)

In the above-described embodiment, a user is correlated with a user level and the price information displayed to a user is controlled according to the user level. Moreover, an ordering right is set in advance to a user and an ordering process is controlled. However, the present invention is not limited thereto. For example, users who can purchase applications may be managed by a purchaser management unit, and during execution of an ordering process, when a user is determined to be authorized to place an order on the basis of the purchaser management unit, ordering of applications may be authorized. Moreover, the purchaser management unit may manage password information (specific password information) known to a user only, and a comparing unit that compares password information received by a receiving unit when a user places an order with the password information managed by the purchaser management unit may be provided so that ordering of applications is authorized when both pieces of password information match to thereby prevent fraud of other persons.

(Modification 3)

In the embodiment based on the conventional business practice, the user level is classified into three levels (an end user, a lower intermediary dealer, and a higher intermediary dealer), and a person capable of performing an application ordering process (that is, a person having an ordering right) is the higher intermediary dealer only. However, the present invention is not limited thereto. For example, the ordering right may be set for respective users on the basis of the creditability of individual users regardless of the user level. Moreover, the ordering right may be set to all higher intermediary dealers, and the ordering right may be set to the end user and the lower intermediary dealer on the basis of the creditability or the like of the individual users. Similarly, the ordering right may be set to all higher intermediary dealers and all lower intermediary dealers, and the ordering right may be set to an end user on the basis of the creditability or the like of individual users. Moreover, since a user ID for accessing the application sales management system 1000 is assigned to users who satisfy predetermined requirements (qualifications or the like), the ordering right may be set to all users assigned with user IDs. In any case, an end user transmits an application ordering request to an intermediary dealer such as a system integrator, for example, so that the end user does not place an order directly to the sales management server system 100. By doing so, the end user can ask an intermediary dealer such as a system integrator to set environments of hardware and software when using applications.

(Modification 4)

In the embodiment described above, the user level is classified into three levels (an end user, a lower intermediary dealer, and a higher intermediary dealer). However, the present invention is not limited thereto. The user level may be classified into two levels or four or more levels according to a business practice.

(Modification 5)

In the embodiment described above, a serial number (a license key) is used as distribution authorization information. However, the present invention is not limited thereto. The distribution authorization information may be information for authorizing distribution of applications.

(Modification 6)

In the embodiment described above, various pieces of information are stored in the storage unit 120 of the sales management server system 100. The pieces of information stored in the storage unit are examples only, and other pieces of information may be included. Moreover, a data retention method is an example only.

EXPLANATION OF REFERENCE NUMERALS

100: Sales management server system
110, 210: Control unit
111: Browsing information providing unit
112: Ordering processing unit
113: Distribution processing unit
114: Mall processing unit
115: Contract renewal processing unit
120, 220: Storage unit
121: Application storage unit
122: User storage unit
123: Mall storage unit
124: Distribution management storage unit
160: Browsing screen
200: Edge server
211: License control unit
221: Application storage unit
300: Edge device
400: Terminal
1000: Application sales management system

What is claimed is:

1. An application sales management server system that manages sales of applications operated by an edge server communicably connected to an edge device, the application sales management server system comprising:
a server including a processor and a non-transitory storage;
the edge server; and
the edge device,
wherein the server is communicably connected to user terminals of each user including an intermediary dealer that relays purchases of applications and an end user who uses the edge device and the edge server via a network,
wherein authorization of users who can purchase an application is managed by the processor,
wherein when an application purchase request is transmitted from the user terminal of a user who can purchase the application, the processor transmits distribution authorization information to the user terminal of the user,
wherein the distribution authorization information identifies an application and indicates authorization of distribution of the application,
wherein in response to receiving the distribution authorization information from the user terminal of a user different from the user who has transmitted the application purchase request, the processor distributes the application identified by the distribution authorization information to the edge server,
wherein the distributed application is downloaded, installed, and executed on the edge server,
wherein the application executed on the edge server collects data from the edge device, and
wherein the edge device is a CNC machine tool or an industrial robot.

2. The application sales management server system according to claim 1, wherein
the processor manages an authorization of the user who can purchase the application and specific password information for specifying the user in correlation,
the processor receives the application purchase request together with the specific password information; and
the processor compares the specific password information received with the specific password information managed, and
when both pieces of password information match, the processor transmits the distribution authorization information to the user terminal of the user.

3. An application sales management server system that manages sales of applications operated by an edge server communicably connected to an edge device, the application sales management server system comprising:
the edge server;
the edge device;
a sales management server; and
a distribution server,
wherein the sales management server and the distribution server are communicably connected to user terminals of each user including an intermediary dealer that relays purchases of applications and an end user who uses the edge device and the edge server via a network,
wherein authorization of users who can purchase an application are managed by the sales management server,
wherein when an application purchase request is transmitted from the user terminal of a user who can purchase the application to the sales management server, the sales management server transmits distribution authorization information to the user terminal of the user,
wherein the distribution authorization information identifies an application and indicates authorization of distribution of the application, wherein in response to receiving the distribution authorization information from the user terminal of a user different from the user who has transmitted the application purchase request, the distribution server distributes the application identified by the distribution authorization information to the edge server, wherein the distributed application is downloaded, installed, and executed on the edge server, wherein the application executed on the edge server collects data from the edge device, and wherein the edge device is a CNC machine tool or an industrial robot.

4. An application sales management method for an application sales management server system for managing sales of applications operated by an edge server communicably connected to an edge device, the application sales management server system being communicably connected to user terminals of each user including an intermediary dealer that relays purchases of applications and an end user who uses the edge device and the edge server via a network, the application sales management method comprising:

managing authorization of users who can purchase an application;

when an application purchase request is transmitted from the user terminal of a user who can purchase the application to the application sales management server system, transmitting distribution authorization information from the application sales management server system to the user terminal of the user, the distribution authorization information identifying an application and indicating authorization of distribution of the application;

receiving, at the application sales management server system, the distribution authorization information from the user terminal of a user different from the user who has transmitted the application purchase request; and in response to the receiving the distribution authorization information from the user different from the user who has transmitted the application purchase request, distributing the application identified by the distribution authorization information from the application sales management server system to the edge server, wherein the distributed application is downloaded, installed, and executed on the edge server, wherein the application executed on the edge server collects data from the edge device, and wherein the edge device is a CNC machine tool or an industrial robot.

5. The application sales management server system according to claim 1, wherein the intermediary dealer comprises at least a system integrator.

6. The application sales management server system according to claim 3, wherein the intermediary dealer comprises at least a system integrator.

7. The application sales management method according to claim 4, wherein the intermediary dealer comprises at least a system integrator.

* * * * *